US012570792B2

(12) United States Patent
Sato et al.

(10) Patent No.: US 12,570,792 B2
(45) Date of Patent: Mar. 10, 2026

(54) POLYETHYLENE FURANOATE, HIGHLY-VISCOUS POLYETHYLENE FURANOATE MANUFACTURING METHOD, POLYESTER COMPOSITION, POLYESTER BOTTLE, POLYESTER BOTTLE MANUFACTURING METHOD, AND BEVERAGE PRODUCT

(71) Applicants: KIRIN HOLDINGS KABUSHIKI KAISHA, Tokyo (JP); Mitsubishi Chemical Corporation, Tokyo (JP)

(72) Inventors: Takashi Sato, Tokyo (JP); Satoshi Kato, Tokyo (JP); Rie Shirahama, Tokyo (JP); Takafumi Asakura, Tokyo (JP); Masaki Nakaya, Tokyo (JP); Yohei Yamaguchi, Tokyo (JP)

(73) Assignees: KIRIN HOLDINGS KABUSHIKI KAISHA, Tokyo (JP); Mitsubishi Chemical Corporation, Tokyo (JP)

(*) Notice: Subject to any disclaimer, the term of this patent is extended or adjusted under 35 U.S.C. 154(b) by 433 days.

(21) Appl. No.: 18/147,322

(22) Filed: Dec. 28, 2022

(65) Prior Publication Data

US 2023/0167232 A1 Jun. 1, 2023

Related U.S. Application Data

(63) Continuation of application No. PCT/JP2021/024822, filed on Jun. 30, 2021.

(30) Foreign Application Priority Data

Jul. 1, 2020 (JP) ................................ 2020-114001

(51) Int. Cl.
*C08G 63/16* (2006.01)
*B29C 49/00* (2006.01)
(Continued)

(52) U.S. Cl.
CPC .......... *C08G 63/16* (2013.01); *B29C 49/0005* (2013.01); *B29C 49/06* (2013.01);
(Continued)

(58) Field of Classification Search
CPC ...... C08G 63/16; C08G 63/672; C08G 63/80; C08G 63/181; B29C 49/0005;
(Continued)

(56) References Cited

U.S. PATENT DOCUMENTS

| | | | | |
|---|---|---|---|---|
| 10,676,567 | B2 | 6/2020 | Kriegel et al. | |
| 2015/0064383 | A1* | 3/2015 | Kriegel .................. | B29C 49/04 264/531 |

(Continued)

FOREIGN PATENT DOCUMENTS

| | | | |
|---|---|---|---|
| CN | 107840948 | A | 3/2018 |
| CN | 107921693 | A | 4/2018 |

(Continued)

OTHER PUBLICATIONS

Highlighted English machine translation for CN107840948A (Year: 2018).*

(Continued)

*Primary Examiner* — Michael C Miggins
(74) *Attorney, Agent, or Firm* — Oblon, McClelland, Maier & Neustadt, L.L.P.

(57) ABSTRACT

This polyethylene furanoate has an intrinsic viscosity of 0.95-1.50 dl/g. Said intrinsic viscosity is measured (the Huggins constant is defined as 0.32) at 30° C. by using an Ubbelohde viscometer, after dissolving 0.25 g of the polyethylene furanoate in 50 ml of a solvent mixture of phenol/1,1,2,2-tetrachloroethane=50/50 (weight ratio).

18 Claims, 1 Drawing Sheet

(51) Int. Cl.

| | |
|---|---|
| ***B29C 49/02*** | (2006.01) |
| ***B29C 49/06*** | (2006.01) |
| ***B29K 67/00*** | (2006.01) |
| ***C08L 67/02*** | (2006.01) |

(52) U.S. Cl.
CPC ........ *C08L 67/02* (2013.01); *B29C 2049/023* (2013.01); *B29K 2067/003* (2013.01); *C08L 2203/10* (2013.01)

(58) Field of Classification Search
CPC ... B29C 49/06; B29C 2049/023; C08L 67/02; C08L 2203/10; B29K 2067/003
See application file for complete search history.

(56) References Cited

U.S. PATENT DOCUMENTS

| | | | |
|---|---|---|---|
| 2017/0334120 | A1 | 11/2017 | Siegl |
| 2018/0141260 | A1 | 5/2018 | Duncan et al. |
| 2018/0155113 | A1 | 6/2018 | Wolak et al. |
| 2018/0244913 | A1 | 8/2018 | Mehta |
| 2019/0031826 | A1 | 1/2019 | Van Berkel et al. |
| 2019/0225745 | A1 | 7/2019 | Sakano et al. |

FOREIGN PATENT DOCUMENTS

| | | | |
|---|---|---|---|
| CN | 110229480 | A | 9/2019 |
| JP | 7-70419 | A | 3/1995 |
| JP | 11-106617 | A | 4/1999 |
| JP | 2000-79633 | A | 3/2000 |
| JP | 2018-510800 | A | 4/2018 |
| JP | 2018-123191 | A | 8/2018 |
| JP | 2018/527443 | A | 9/2018 |
| JP | 2019-538704 | A | 12/2019 |
| WO | WO 2015/031907 | A1 | 3/2015 |
| WO | WO 2018/012572 | A1 | 1/2018 |
| WO | 2019-104161 | A | 6/2019 |

OTHER PUBLICATIONS

Combined Chinese Office Action and Search Report issued Feb. 28, 2025 in Chinese Patent Application No. 202180053100.9 (with unedited computer-generated English translation), 25 pages.

Extended European Search Report issued Jan. 29, 2024 in European Patent Application No. 21834490.1, 13 pages.

Partial Search Report issued Nov. 8, 2023, in corresponding European patent application No. 21834490.1, 13 pages.

Nejib Kasmi et al., "Solid-State Polymerization of Poly(Ethylene Furanoate) Biobased Polyester, II: An efficient and facile method to synthetize high molecular weight polyester appropriate for food packaging applications", Polymers 2018, 10, 471, 2018, XP002803871, pp. 1-21.

Office Action issued in corresponding Japanese Patent Application No. 2022-534093 mailed on Nov. 18, 2025 (with Machine Translation) 8 pages.

Japanese Office Action issued Jul. 15, 2025, in corresponding Japanese Patent Application No. 2022-534093 (with English Translation), 12 pages.

Chinese Office Action issued Aug. 29, 2025, in corresponding Chinese Patent Application No. 202180053100.9 (with English Translation), 22 pages.

Office Action issued in corresponding EP patent application No. 21834490.1 dated Dec. 22, 2025. (5 pages).

International Search Report issued Sep. 14, 2021 in PCT/JP2021/024822, 5 pages.

International Preliminary Report on Patentability and Written Opinion issued Dec. 13, 2022 in PCT/JP2021/024822, 7 pages.

* cited by examiner

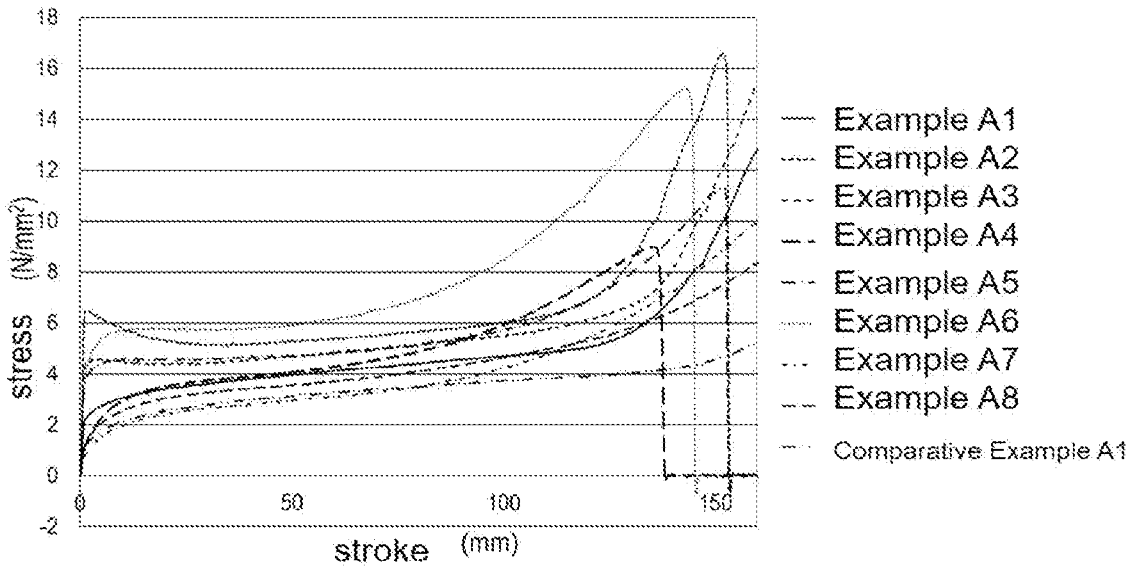
18
16
14
12
10
8
6
4
2
0
-2
stress (N/mm²)
0
50
100
150
stroke (mm)
Example A1
Example A2
Example A3
Example A4
Example A5
Example A6
Example A7
Example A8
Comparative Example A1

POLYETHYLENE FURANOATE, HIGHLY-VISCOUS POLYETHYLENE FURANOATE MANUFACTURING METHOD, POLYESTER COMPOSITION, POLYESTER BOTTLE, POLYESTER BOTTLE MANUFACTURING METHOD, AND BEVERAGE PRODUCT

CROSS-REFERENCE TO RELATED APPLICATION

This is a continuation of International Application PCT/JP2021/024822, filed on Jun. 30, 2021, and designated the U.S., and claims priority from Japanese Patent Application 2020-114001 which was filed on Jul. 1, 2020, the entire contents of which are incorporated herein by reference.

TECHNICAL FIELD

The present invention relates to polyethylene furanoate that has excellent heat resistance and gas barrier properties and can be manufactured from a raw material derived from biomass, polyester compositions comprising polyethylene furanoate, bottles using them and having excellent heat resistance, gas barrier properties, creep resistance, and impact resistance, methods of manufacturing highly-viscous polyester, and methods of manufacturing bottles.

BACKGROUND ART

Recently, the demand for polyester using plant-derived raw materials has been growing from the viewpoint of environmental friendliness.

Examples of the plant-derived raw materials of polyester include dicarboxylic acids such as succinic acid, glutaric acid, sebacic acid, ferulic acid, coffeic acid, and 2,5-furandicarboxylic acid. The examples also include diols such as ethanediol, propanediol, butanediol, and isosorbide. Among these, 2,5-furandicarboxylic acid attracts attention as an alternative raw material for terephthalic acid.

Examples of polyester using 2,5-furandicarboxylic acid include polyalkylene furanoate such as polybutylene furanoate, polytrimethylene furanoate, and polyethylene furanoate. Among these, polyethylene furanoate (PEF) is expected as an alternative polyester for polyethylene terephthalate (PET), used in various industrial applications.

For example, Patent Document 1 discloses a preform containing polyethylene furanoate for manufacturing of a plastic container by stretch blow molding. According to the specific description, a preform having a viscosity of 0.75 dl/g to 0.9 dl/g and a water content of less than 50 ppm is prepared in manufacturing of the preform, by using which a container having high mechanical strength and barrier properties can be obtained.

For polyethylene terephthalate containers, an intrinsic viscosity of about 0.7 is considered appropriate, and it is known that an intrinsic viscosity exceeding 0.9 deteriorates the flowability and moldability, which is thus undesirable (See Patent Document 2).

PRIOR ART REFERENCES

Patent Documents

Patent Document 1: JP-T 2018-510800
Patent Document 2: JP-A 2000-79633

SUMMARY OF THE INVENTION

Problems to be Solved by the Invention

However, the present inventors have conducted tests on containers made of polyethylene furanoate to find that polyethylene furanoate has insufficient blow moldability, and blow molded containers made of polyethylene furanoate have insufficient impact resistance or other properties.

The present invention has been made in view of the aforementioned problems of conventional arts. Thus, objects of the present invention are to provide polyester that can be manufactured from a biomass-derived raw material and has excellent heat resistance, gas barrier properties, and blow moldability, polyester compositions comprising the polyester, bottles using them and having excellent heat resistance, gas barrier properties, and impact resistance.

Means for Solving the Problems

In order to solve the above problems, the present inventors have conducted many studies to find that use of polyethylene furanoate having a specific intrinsic viscosity can solve the above problems. It has also been found that use of a polyester composition comprising polyethylene furanoate and other thermoplastic resin can solve the above problems. It has further been found that in a method of manufacturing highly-viscous polyethylene furanoate, the method comprising a step of manufacturing a polyethylene furanoate raw material, and a step of subjecting the polyethylene furanoate raw material to solid phase polymerization, the step of manufacturing polyethylene furanoate is performed using a specific catalyst to obtain a polyethylene furanoate raw material having a specific intrinsic viscosity and a specific decarboxylated end group content, and the polyethylene furanoate raw material is then subjected to solid phase polymerization to obtain highly-viscous polyester that cannot have been obtained by conventional methods, which is effective to solve the above problems.

Accordingly, the scope of the present invention is as following:

[1]

Polyethylene furanoate having an intrinsic viscosity of from 0.95 dl/g to 1.50 dl/g, as measured by the following method comprising:

- dissolving 0.25 g of polyethylene furanoate in 50 ml of a mixed solvent of phenol/1,1,2,2-tetrachloroethane=50/50 (weight ratio); and
- measuring the intrinsic viscosity using an Ubbelohde viscometer at 30° C.,
- wherein the Huggins constant is 0.32;

[2]

Polyethylene furanoate according to [1], containing titanium atoms in an amount of from 1 to 100 ppm;

[3]

Polyethylene furanoate according to [1] or [2] for use in blow-molded bottles;

[4]

A polyethylene furanoate bottle, which has an intrinsic viscosity of from 0.75 dl/g to 1.2 dl/g, as measured by the following method comprising: dissolving 0.25 g of bottle fragments in 50 ml of a mixed solvent of phenol/1,1,2,2-tetrachloroethane=50/50 (weight ratio); and measuring the intrinsic viscosity using an Ubbelohde viscometer at 30° C., wherein the Huggins constant is 0.32;

[5]

The polyethylene furanoate bottle according to [4], wherein the degree of crystallinity is from 10% to 40%, as determined by a wide-angle X-ray diffraction method according to the following equation:

degree of crystallinity (%)=peak area of crystalline component/(peak area of crystalline component+peak area of amorphous component)×100;

[6]

A method of manufacturing highly-viscous polyethylene furanoate, comprising:

a step of manufacturing a polyethylene furanoate raw material, in which the polyethylene furanoate raw material is manufactured using a titanium catalyst; and a solid phase polymerization step, in which the polyethylene furanoate raw material is subjected to solid phase polymerization;

wherein the polyethylene furanoate raw material has an intrinsic viscosity of from 0.65 dl/g to 0.85 dl/g, as measured by the following method, and has a decarboxylated end group content represented by the following formula of 20 eq/t or less;

[Chem 1]

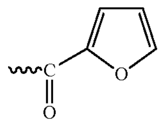

the method comprising:

dissolving 0.25 g of the polyethylene furanoate raw material in 50 ml of a mixed solvent of phenol/1,1,2,2-tetrachloroethane=50/50 (weight ratio); and measuring the intrinsic viscosity using an Ubbelohde viscometer at 30° C., wherein the Huggins constant is 0.32;

[7]

The method of manufacturing highly-viscous polyethylene furanoate according to [6], wherein the ratio of the decarboxylated end group content to the total of the decarboxylated end group content and the carboxyl end group content in the polyethylene furanoate raw material is 0.5 or less;

[8]

A polyester composition comprising the polyethylene furanoate according to any of [1] to [3], and a thermoplastic resin other than the polyethylene furanoate;

[9]

The polyester composition according to [8], wherein the amount of the polyethylene furanoate is from 1 to 20% by weight, and wherein the thermoplastic resin is polyethylene terephthalate;

[10]

A polyester composition comprising 50% by weight or more of polyethylene furanoate, wherein the polyester composition further comprises a crosslinking thermoplastic resin and/or other thermoplastic polyester resin other than the polyethylene furanoate, wherein the other thermoplastic polyester resin has a terephthalic acid structural unit, and has a structural unit selected from a 1,4-butanediol structural unit and a polytetramethylene glycol structural unit;

[11]

A method of manufacturing a polyester bottle comprising polyethylene furanoate, the method comprising:

an injection molding step of manufacturing a preform from a polyester raw material; and a blow molding step of manufacturing a bottle from the preform, wherein the polyester raw material comprises the polyethylene furanoate according to any of [1] to [3];

[12]

A method of manufacturing a polyester bottle comprising polyethylene furanoate, the method comprising:

an injection molding step of manufacturing a preform from a polyester raw material; and a blow molding step of manufacturing a bottle from the preform, wherein the polyester raw material is a polyester composition according to [10];

[13]

A blow-molded bottle that is a molded product made of the polyethylene furanoate according to any of [1] to [3], or the polyester composition according to any of [8] to [10];

[14]

The blow-molded bottle according to [13], for filling with carbonated liquid;

[15]

The blow-molded bottle according to [13], for filling with hot beverage;

[16]

A beverage product in which a beverage is charged in the bottle according to [4] or [5], or the blow-molded bottle according to any of [13] to [15].

Effect of the Invention

The polyethylene furanoate and polyester composition of the present invention can employ a biomass-derived raw material, and has excellent heat resistance and gas barrier properties, as well as excellent blow moldability, so that they can be particularly suitably used in a blow-molded bottle application to obtain a bottle of light weight and excellent in impact resistance. The polyethylene furanoate and polyester composition of the present invention can also be suitably used as polyester for use in gas barrier material that can be substituted for polyamide-based gas barrier materials.

BRIEF DESCRIPTION OF THE DRAWINGS

FIG. 1 is a graph showing the relationship between stroke and stress in Examples A1 to A8 and Comparative Example A1.

DETAILED DESCRIPTION OF THE INVENTION

Representative embodiments to perform the present invention will be described in detail below, but do not limit the present invention as long as they do not depart from the scope of the invention.

As used herein, the term "-derived structural unit" refers to a structural unit that is derived from the monomer and incorporated into polyester polymer. Hereinafter, the term "-derived structural unit" may be simply referred to as "unit" or "structural unit." For example, "diol-derived structural unit" may be referred to as "diol unit" or "diol structural unit," and "dicarboxylic acid-derived structural unit" may be referred to as "dicarboxylic acid unit" or "dicarboxylic acid structural unit," and "2,5-furandicarboxylic acid-derived structural unit" may be referred to as "2,5-furandicarboxylic acid unit" or "2,5-furandicarboxylic acid structural unit," and "1,2-ethanediol-derived structural unit" may be referred to as "1,2-ethanediol unit" or "1,2-ethanediol structural unit."

As used herein, the term "main structural unit" refers to a structural unit that accounts for the largest proportion in the "structural units," which usually accounts for 50 mol % or more in the structural units, preferably 70 mol % or more, more preferably 80 mol % or more, and still more preferably 90 to 100 mol %.

One embodiment of the present invention provides polyethylene furanoate. The polyethylene furanoate of the present embodiment is suitable particularly for use in blow-molded bottles.

Here, the polyethylene furanoate of the present embodiment comprises a 2,5-furandicarboxylic acid unit as the main structural unit of the entire dicarboxylic acid units constituting the polyester, and a 1,2-ethanediol structural unit as the main structural unit of the entire diol units constituting the polyester.

[Polyethylene Furanoate]

The polyethylene furanoate of the present embodiment has a structural unit derived from 2,5-furandicarboxylic acid and a 1,2-ethanediol structural unit.

<Dicarboxylic Acid Structural Unit>

The polyethylene furanoate of the present embodiment comprises a structural unit derived from 2,5-furandicarboxylic acid as a dicarboxylic acid structural unit. Inclusion of the structural unit derived from 2,5-furandicarboxylic acid increases the glass transition temperature, improves the heat resistance, and also improves the gas barrier properties. The polyethylene furanoate of the present embodiment preferably comprises the structural unit derived from 2,5-furandicarboxylic acid as the main dicarboxylic acid unit. Thus, the structural unit derived from 2,5-furandicarboxylic acid is contained usually in an amount of 50 mol % or more based on 100 mol % of the entire dicarboxylic acid structural units, preferably in an amount of 70 mol % or more, more preferably in an amount of 80 mol % or more, still more preferably in an amount of from 90 to 100 mol %.

The polyethylene furanoate of the present embodiment may have a structural unit of dicarboxylic acid other than 2,5-furandicarboxylic acid unit (also referred to as "other dicarboxylic acid") as a dicarboxylic acid unit. Examples of the other dicarboxylic acid include aliphatic dicarboxylic acids and aromatic dicarboxylic acids. The aliphatic dicarboxylic acids include chain aliphatic dicarboxylic acids such as oxalic acid, succinic acid, glutaric acid, adipic acid, sebacic acid, dimer acid, and dodecanedioic acid; and cyclic aliphatic dicarboxylic acids such as 1,6-cyclohexanedicarboxylic acid. The aromatic dicarboxylic acids include terephthalic acid, isophthalic acid, naphthalenedicarboxylic acid, and diphenyldiacarboxylic acid. Among these dicarboxylic acids, the aliphatic dicarboxylic acids are preferable because of the excellent flexibility, and the chain aliphatic dicarboxylic acids are more preferable.

For other dicarboxylic acid structural unit to be contained in the case where the other dicarboxylic acid structural unit is contained as a dicarboxylic acid structural unit, only one dicarboxylic acid structural unit may be contained, or two or more dicarboxylic acid structural units may be contained in any combination and any ratio. When the polyethylene furanoate of the present embodiment comprises other dicarboxylic acid structural unit, the amount is preferably smaller in that the effect described above by containing the 2,5-furandicarboxylic acid structural unit tends to be sufficiently obtained. At the same time, the amount is also preferably larger in that the flexibility or the like will be excellent. Thus, when other dicarboxylic acid structural unit is contained, the amount is usually 10 mol % or more based on 100 mol % of the entire dicarboxylic acid structural units, preferably 20 mol % or more, and more preferably 30 mol % or more. The upper limit is usually 50 mol %.

A dicarboxylic acid structural unit can be introduced in polyethylene furanoate by using a dicarboxylic acid component such as dicarboxylic acid, dicarboxylic anhydride, a lower alkyl ester of dicarboxylic acid (the carbon number of the alkyl group is from 1 to 4), chloride of dicarboxylic acid or the like as a raw material for manufacturing the polyethylene furanoate of the present embodiment.

<Diol Structural Unit>

In the present embodiment, a 1,2-ethanediol structural unit is contained as a diol structural unit. Inclusion of a 1,2-ethanediol structural unit improves the heat resistance and gas barrier properties of the bottle manufactured using the polyethylene furanoate.

As the diol structural unit, diol other than 1,2-ethanediol (hereinafter also referred to as "other diol") may be contained as a structural unit. Examples of the other diol include aliphatic diols other than 1,2-ethanediol (hereinafter also referred to as "other aliphatic diol") and aromatic diols. Examples of the other aliphatic diol structural unit include 2,2'-oxydiethanol, 2,2'-(ethylenedioxy)diethanol, 1,3-propanediol, 1,2-propanediol, 1,4-butanediol, 1,5-pentanediol, 1,6-hexanediol, 1,4-cyclohexanediol, 1,4-cyclohexanedimethanol, ethylene glycol, diethylene glycol, triethylene glycol, and isosorbide.

Examples of the aromatic diols include xylylene glycol, 4,4'-dihydroxybiphenyl, 2,2-bis(4'-hydroxyphenyl)propane, 2,2-bis(4'-p-hydroxyethoxyphenyl)propane, bis(4-hydroxyphenyl)sulfone, and bis(4-Q-hydroxyethoxyphenyl)sulfone.

When the polyethylene furanoate of the present embodiment comprises other diol structural unit, only one other diol may be contained, or two or more other diols may be contained in any combination and any ratio.

Among these, the other diol comprises preferably an aliphatic diol such as 1,4-butanediol or 1,3-propanediol, and particularly preferably 1,4-butanediol, from the viewpoint of further improvement of the heat resistance and gas barrier properties of the bottle. The polyethylene furanoate of the present embodiment preferably comprise a structural unit derived from an aliphatic diol as the main diol structural unit. Thus, it is preferable from the viewpoint of improvement of the heat resistance and gas barrier properties that the aliphatic diol structural unit is usually contained in an amount of 50 mol % or more based on 100 mol % of the entire diol structural units contained in polyethylene furanoate, preferably 70 mol % or more, more preferably 80 mol % or more, still more preferably 90 mol % or more, and particularly preferably 100 mol %.

<Other Copolymerization Component>

The polyethylene furanoate of the present embodiment may comprise a structural unit derived from a copolymerization component other than dicarboxylic acid or diol. Examples of the other copolymerization component include compounds containing functional group having three or more functionalities.

Examples of the functional group having three or more functionalities include polyols having three or more functionalities, polyhydric carboxylic acid having three or more functionalities (and anhydrides, oxychlorides, and lower alkyl esters thereof), hydroxycarboxylic acids having three or more functionalities (and anhydrides, oxychlorides, and lower alkyl esters thereof), and amines having three or more functionalities.

Examples of the polyols having three or more functionalities include glycerol, trimethylolpropane, and pentaerythritol. These may be used alone or in any combination of two or more at any ratio.

Examples of the polyhydric carboxylic acids having three or more functionalities and anhydrides thereof include trimesic acid, propanetricarboxylic acid, trimellitic anhydride, pyromellitic dianhydride, benzophenonetetracarboxylic anhydride, and cyclopentatetracarboxylic anhydride. These may be used alone or in any combination of two or more at any ratio.

Examples of the hydroxycarboxylic acids having three or more functionalities include malic acid, hydroxyglutaric acid, hydroxymethylglutaric acid, tartaric acid, citric acid, hydroxyisophthalic acid, and hydroxyterephthalic acid. These may be used alone or in any combination of two or more at any ratio.

When the polyethylene furanoate of the present embodiment comprises a structural unit derived from a compound having a functional group having three or more functionalities, the amount is preferably large in that the strain hardening properties tend to be improved. At the same time, the amount is also preferably small in that crosslinking of the polyethylene furanoate of the present embodiment is appropriately advanced, strands tend to be stably extracted, and thus the moldability, mechanical properties, and other properties tend to be improved. Thus, the amount is usually 5 mol % or less based on 100 mol % in total of the entire structural units constituting polyethylene furanoate, particularly preferably 4 mol % or less, and still particularly preferably 3 mol % or less. Binary polyesters without any other copolymerization component are most preferable.

<Chain Extender>

In manufacturing of the polyethylene furanoate of the present embodiment, a chain extender such as a carbonate compound, a diisocyanate compound, dioxazoline, or a silicate ester may be used. For example, a carbonate compound such as diphenyl carbonate can be used preferably in an amount of 20 mol % or less based on 100 mol % of the entire structural units of polyethylene furanoate, and more preferably 10 mol % or less, to obtain polyethylene furanoate carbonate.

In this case, specific examples of the carbonate compound include diphenyl carbonate, ditolyl carbonate, bis(chlorophenyl) carbonate, m-cresyl carbonate, dinaphthyl carbonate, dimethyl carbonate, diethyl carbonate, dibutyl carbonate, ethylene carbonate, diamyl carbonate, and dicyclohexyl carbonate. Other carbonate compounds can also be used that are composed of the same or different types of hydroxy compound(s), which are derived from hydroxy compounds such as phenols and alcohols.

Specific examples of the diisocyanate compound include known diisocyanates such as 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, and isophorone diisocyanate.

Specific examples of the silicate ester include tetramethoxysilane, dimethoxydiphenylsilane, dimethoxydimethylsilane, and diphenyldihydroxy silane.

Any of these may be used alone or in any combination of two or more at any ratio.

<End Capping Agent>

In the present embodiment, the end group of polyethylene furanoate may be capped with carbodiimide, an epoxy compound, a monofunctional alcohol or carboxylic acid, or the like. When an end capping agent is used, the amount is preferably 20 mol % or less based on 100 mol % of the entire structural unit of polyethylene furanoate, and more preferably 10 mol % or less.

In this case, examples of the carbodiimide compound as an end capping agent include compounds having one or more carbodiimide group in the molecule (including polycarbodiimide compounds). Specific examples include monocarbodiimide compounds such as dicyclohexyl carbodiimide, diisopropyl carbodiimide, dimethyl carbodiimide, diisobutyl carbodiimide, dioctyl carbodiimide, t-butylisopropyl carbodiimide, diphenyl carbodiimide, di-t-butyl carbodiimide, di-β-naphthyl carbodiimide, and N,N'-di-2,6-diisopropylphenyl carbodiimide.

Any of these may be used alone or in any combination of two or more at any ratio.

In the manufacturing of the polyethylene furanoate of the present embodiment, various additives, for example, heat stabilizers, antioxidants, hydrolysis inhibitors, crystal nucleating agents, flame retardants, antistatic agents, mold release agents, and ultraviolet absorbers may be used without impairing the properties similarly with the polyester composition of the present embodiment as described below.

As described above, the polyethylene furanoate of the present embodiment may comprise a structural unit other than the structural unit derived from 2,5-furandicarboxylic acid or the structural unit derived from 1,2-ethanediol. However, even in such a case, the total amount of the structural unit derived from 2,5-furandicarboxylic acid and the structural unit derived from 1,2-ethanediol is preferably 80 mol % or more based on 100 mol % of the entire structural units of polyethylene furanoate, and more preferably 90 mol % or more.

As a raw material used in the manufacturing of the polyethylene furanoate of the present embodiment, a petroleum-derived raw material may be used, or a biomass-derived raw material may be used. A biomass-derived raw material is preferably used from the viewpoint of environmental protection. More preferably, a biomass-derived raw material is a main structural unit. Examples of the biomass-derived raw material include dicarboxylic acid components such as 2,5-furandicarboxylic acid, succinic acid, glutaric acid, adipic acid, and sebacic acid; diol components such as 1,3-propanediol, 1,4-butanediol, and 1,2-ethanediol.

<Method of Manufacturing Polyethylene Furanoate>

A known method for manufacturing polyethylene furanoate resins can be used as the method of manufacturing the polyethylene furanoate of the present embodiment.

With respect to the reaction conditions in this case, appropriate conditions that have been conventionally used can be set, and are not particularly limited.

Specifically, polyethylene furanoate resins can be manufactured by performing an esterification or transesterification reaction step using a dicarboxylic acid component comprising 2,5-furandicarboxylic acid as an essential component, and 1,2-ethanediol, and optionally using other copolymerization component or the like, and a subsequent polycondensation reaction step. It is noted that the esterification or transesterification reaction step and the polycondensation reaction step are also collectively referred to as a manufacturing process of polyethylene furanoate raw materials. In addition, polyethylene furanoate obtained by the manufacturing process of polyethylene furanoate raw materials may be referred to as simply "polyethylene furanoate" or "polyethylene furanoate raw material." Optionally, the chain extender or the end capping agent as described above may be used in the reaction. In addition, to increase the intrinsic viscosity, the polycondensation reaction step of the manufacturing process of polyethylene furanoate raw materials is preferably followed by a further solid phase polymerization step.

<Esterification or Transesterification Reaction Step>

The esterification or transesterification reaction is typically performed by supplying a dicarboxylic acid component and a diol component, and optionally other copolymerization component or the like to a reactor equipped with a stirrer and a distilling tube, and stirring them preferably in the presence of a catalyst, under an inert gas atmosphere, and under a reduced pressure, while removing by evaporation a by-product generated by the reaction, such as water, out of the system, to advance the reaction. The ratio of the raw materials used, or the molar ratio of the total of the diol components to the total of the dicarboxylic acid components is usually from 1.0 to 3.0-fold molar amount. A higher ratio of the diol components is preferable in that the esterification reaction tends to be advanced sufficiently, that decarboxylated ends tend to decrease, and that polyethylene furanoate having less carboxyl ends than hydroxyl ends tend to be obtained through the polycondensation reaction. At the same time, a lower ratio of the diol components is preferable in that ether structures are less likely to be formed by a side reaction due to aliphatic diol components. Thus, the lower limit of the molar ratio is preferably 1.25-fold molar amount, and more preferably 1.30-fold molar amount. At the same time, the upper limit is preferably 2.5-fold molar amount, and more preferably 2.0-fold molar amount.

The esterification or transesterification reaction is preferably performed such that higher reaction rate of esterification is achieved because polyethylene furanoate having lower decarboxylated end group content tend to be obtained. Specifically, longer reaction time at lower temperature is preferable. This allows the reaction rate of esterification to increase and by-products to be less likely to occur.

The reaction temperature is preferably 160° C. or higher, more preferably 170° C. or higher, and still more preferably 180° C. or higher. At the same time, the reaction temperature is preferably 230° C. or lower, more preferably 220° C. or lower, and still more preferably 210° C. or lower. Here, sufficient advance of the esterification or transesterification reaction results in less tendency for side reactions such as decarboxylation of furandicarboxylic acid to occur, and more tendency for the subsequent polycondensation reaction or solid phase polymerization reaction to be advanced. In addition, ether structures are less likely to be formed by a side reaction due to diol components, and thus the heat resistance can be increased. The reaction pressure is usually from the normal pressure to 10 kPa, and is preferably the normal pressure. The reaction atmosphere is usually under an inert gas atmosphere such as nitrogen or argon. The reaction time is usually 1 hour or more, and the upper limit is usually 10 hours, and preferably 8 hours. The reaction rate can be determined by quantifying unreacted carboxylic acid ends derived from furandicarboxylic acid components. The reaction rate at the end of the reaction is preferably 85 mol % or more, and more preferably 90 mol % or more.

<Polycondensation Reaction Step>

The polycondensation reaction step is usually performed under a reduced pressure following the esterification or transesterification reaction step. The polycondensation reaction is preferably performed from a lower temperature at the start of the reduced pressure because of less tendency to produce by-products.

The reaction temperature is preferably from the melting point of polyethylene furanoate to be obtained to the melting point +100° C. Whether the relationship between the reaction temperature and the melting point of the obtained polyethylene furanoate is within the preferred range can be determined by performing the reaction with a rough prediction of the melting point of polyethylene furanoate to be obtained and then measuring the melting point of the obtained polyethylene furanoate. Specifically, the reaction temperature is preferably 230° C. or higher, and more preferably 240° C. or higher. At the same time, the reaction temperature is preferably 280° C. or lower, and more preferably 270° C. or lower. When the reaction temperature is within the ranges, the reaction can be performed under such conditions that coloring or the like due to thermal decomposition, side reaction, or the like is less likely to occur, and at a sufficiently high reaction rate. In particular, because of less tendency for furandicarboxylic acid to undergo decarboxylation, which leads to less tendency for carboxyl end groups to be produced than hydroxyl end groups, the reaction in the case where a solid phase polymerization reaction is subsequently performed is easily advanced.

For the reaction pressure, vacuuming is initiated at the time when a predetermined temperature is reached. The final pressure is usually $0.01\times10^3$ Pa or more, and preferably $0.05\times10^3$ Pa or more. The final pressure is also usually $1.4\times10^3$ Pa or less, preferably $0.6\times10^3$ Pa or less, and more preferably $0.3\times10^3$ Pa or less. When the pressure during the reaction is lower, polymerization is finished in shorter time, which leads to less tendency of reduction of the molecular weight or coloring due to thermal decomposition of polyethylene furanoate, so that polyethylene furanoate showing practically sufficient properties tends to be obtained. At the same time, the reaction pressure is preferably higher to avoid the need to use expensive equipment.

The reaction time is usually 1 hour or more and 15 hours or less. The reaction time is preferably 10 hours or less, and more preferably 8 hours or less. When the reaction time is long, it is likely that the reaction is sufficiently performed to obtain polyethylene furanoate having high degree of polymerization and excellent mechanical properties. On the other hand, when the reaction time is short, reduction of the molecular weight due to thermal decomposition of polyethylene furanoate is less likely to occur, so that polyethylene furanoate having excellent mechanical properties tends to be obtained.

After completion of the polycondensation reaction, polyethylene furanoate is generally extracted in a molten state into a strand shape, cooled, and cut into a pellet shape.

<Catalyst>

Reactions in the process of manufacturing the polyethylene furanoate raw material are preferably performed in the presence of a titanium catalyst because, for example, the viscosity of polyethylene furanoate is easily increased by further subjecting the polyethylene furanoate raw material obtained by a polycondensation reaction to solid phase polymerization. The amount when a titanium catalyst is used is preferably an amount that is from 1 to 100 ppm as a Ti element in polyethylene furanoate, and more preferably an amount that is from 1 to 50 ppm. The Ti element concentration relative to 1 mol of the raw material dicarboxylic acid component is preferably 0.000001 mol or more, more preferably 0.000002 mol or more, and still more preferably 0.0000038 mol or more, while the ratio is preferably 0.00038 or less, more preferably 0.0003 or less, still more preferably 0.00025 or less, and particularly preferably 0.00019 or less.

When the amount of the titanium catalyst is within the range, polyethylene furanoate can be efficiently manufactured at a fast polymerization reaction rate while preventing the decarboxylation reaction of furandicarboxylic acid, and polyethylene furanoate can be obtained that has less coloration and excellent melt thermal stability and hydrolysis properties. In addition, solid phase polymerization can provide highly-viscous polyethylene furanoate.

The timing when the catalyst is added is not particularly limited, and the catalyst may be added at the time of raw material preparation or during the manufacturing process. Alternatively, the catalyst may be divided and added two or more times, such as at the time of raw material preparation and during the manufacturing process.

The titanium compound used as the catalyst is not particularly limited. The titanium compound is preferably tetraalkyl titanate. Specific examples include tetra-n-propyl titanate, tetraisopropyl titanate, tetra-n-butyl titanate, tetra-t-butyl titanate, tetraoctyl titanate, tetraphenyl titanate, tetracyclohexyl titanate, tetrabenzyl titanate, and mixed titanate thereof. The examples also include titanium oxyacetylacetonate, titanium tetraacetylacetonate, titanium (diisoproxide)acetylacetonate, titanium bis(ammonium lactate)dihydroxide, titanium bis(ethylacetoacetate)diisopropoxide, titanium(triethanolaminate)isopropoxide, polyhydroxytitanium stearate, tetrastearyl titanate, titanium lactate, titanium triethanolaminate, and butyl titanate dimer. The examples further include titanium oxide, and complex oxides containing titanium and silicon.

Among these, tetraisopropyl titanate, tetra-n-butyl titanate, tetraoctyl titanate, titanium oxy-acetylacetonate, titanium tetraacetylacetonate, polyhydroxytitanium stearate, tetrastearyl titanate, titanium lactate, butyl titanate dimer, or titania/silica complex oxide is more preferable.

In addition to the titanium catalyst, a metallic compound such as germanium, zirconium, hafnium, antimony, tin, magnesium, calcium, zinc, aluminum, cobalt, lead, cesium, manganese, lithium, potassium, sodium, copper, or barium may be used in combination. Among these, a germanium compound, a magnesium compound, a tin compound, a zinc compound is suitable, and particularly suitable examples include a magnesium compound and a germanium compound.

One of these catalysts may be used alone, or two or more may be used in any combination and at any ratio. Catalysts other than them may further be used in combination as long as they do not undermine the purpose of the present invention.

<Additive>

In the manufacturing process of polyethylene furanoate raw materials, a heat stabilizer may be used. Use of a heat stabilizer can prevent the thermal decomposition during the polymerization reaction. As the heat stabilizer, a known heat stabilizer can be used. Specific examples of the heat stabilizer include hindered phenol-based compounds, hindered amine-based compounds, and phosphorus-based compounds. Among these, phosphorus-based compounds are preferable.

A substance that prevents the by-production of ether components due to side reactions in the manufacture of polyethylene terephthalate, such as tetraethylammonium hydroxide, an alkali metal compound, or a phosphorus compound, may be used.

When such an additive is used, it may be added in supplying the raw materials, or may be added in the steps during the manufacturing of the polyethylene furanoate, or in the step of extracting the manufactured polyethylene furanoate. Alternatively, it may be added to the extracted product.

<Intrinsic Viscosity>

The intrinsic viscosity of the polyethylene furanoate raw material after the completion of the polycondensation reaction is preferably 0.5 dl/g or more, more preferably 0.6 dl/g or more, and particularly preferably 0.65 dl/g or more. The intrinsic viscosity after the completion of the polycondensation reaction is usually 0.85 dl/g or less. When the intrinsic viscosity is within the range, it is easy to smoothly perform the process after the polycondensation reaction, from the step of extracting polyethylene furanoate to the step of cutting it, so that polyethylene furanoate having excellent mechanical properties tends to be obtained. In addition, solid phase polymerization following the polycondensation reaction tends to further increase the viscosity. The intrinsic viscosity of the polyethylene furanoate raw material can be adjusted by changing the polymerization temperature, the polymerization time, the pressure during the polymerization reaction, or the like in manufacturing of the polyethylene furanoate raw material. As described below, the polyethylene furanoate raw material after the polycondensation reaction can further be subjected to solid phase polymerization to achieve increased viscosity.

The intrinsic viscosity of the polyethylene furanoate raw material is measured using an Ubbelohde viscosity tube for a solution at 30° C. obtained by accurately weighing 0.25 g of the polyethylene furanoate raw material, then adding it to and dissolving it in 50 ml of a mixed solvent of phenol/1,1,2,2-tetrachloroethane=50/50 (weight ratio). Here, the Huggins constant is 0.32.

<End Group Content>

The amount of the decarboxylated end group represented by the following formula in the polyethylene furanoate raw material is preferably 20 eq/t or less, and more preferably 10 eq/t or less, while the decarboxylated end group content is usually 0.01 eq/t or more.

[Chem 2]

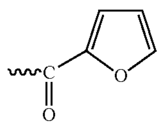

When the decarboxylated end group content in the polyethylene furanoate raw material is not more than the specific content described above, a polycondensation reaction followed by solid phase polymerization is likely to result in further increased viscosity. The decarboxylated end group content in the polyethylene furanoate raw material can be adjusted by devising the conditions of esterification or transesterification and polycondensation reactions as described above. To reduce the decarboxylated end group content, esterification or transesterification is preferably performed such that the reaction rate is higher. Specifically, the reaction time at lower temperature is preferably longer. Thus, the reaction rate of esterification can be increased, and by-products can be less likely to occur. The polycondensation reaction is preferably performed from a lower temperature at the start of the reduced pressure because of less tendency to produce by-products. Accordingly, by determining the decarboxylated end group content of the polyethylene furanoate raw material manufactured by performing the esterification or transesterification and polycondensation reactions under the preferred conditions as described above, and selecting a polyethylene furanoate raw material having a desired content, a polyethylene furanoate raw material in which the decarboxylated end group content is a specific amount or less can be obtained.

With respect to the hydroxyl end group content and the carboxyl end group content of the polyethylene furanoate raw material, the carboxyl end group content is preferably lower than the hydroxyl end group content because the subsequent solid phase polymerization is easily advanced. Specifically, the carboxyl end group content relative to the total amount of the carboxyl end group content and the hydroxyl end group content is preferably 1.0 or less, more preferably 0.9 or less, and still more preferably 0.5 or less. At the same time, the ratio is usually 0.01 or more. The relative amounts of the hydroxyl end group and the carboxyl end group can be adjusted, for example, by changing the amounts of the supplied diol component and dicarboxylic acid component as the raw materials, or the polycondensation temperature, as described above. Then, by determining the carboxyl end group content and the hydroxyl end group content of the thus manufactured polyethylene furanoate raw material, and selecting polyester having desired relative amounts, a polyethylene furanoate raw material in which the carboxyl end group content and the hydroxyl end group content are within specific ranges can be obtained.

The decarboxylated end group content and the hydroxyl end group content of the polyethylene furanoate raw material can be determined by collecting 10 to 20 mg of the polyethylene furanoate raw material, dissolving it in 1 g of a mixed solvent of deuterated chloroform/hexafluoroisopropanol $d_2$ (the weight ratio is 2/1), further adding 60 μl of pyridine-$d_5$ to prepare a sample, and performing $^1$H-NMR analysis on the sample using a 400 MHz nuclear magnetic resonance apparatus manufactured by Brucker.

Specifically, through the $^1$H-NMR analysis, the decarboxylated end group content and the hydroxyl end group content of the polyethylene furanoate raw material can be calculated using the following formulae:

$$\text{Decarboxylated end group content (eq/t)}=4d/(182a+226c)\times 10^6$$

$$\text{Hydroxyl end group content (eq/t)}=2b/(182a+226c)\times 10^6$$

In the formulae, a represents the integrated value of the peaks of the aliphatic diol structural units, b represents the integrated value of the peaks of the hydroxyl end groups, c represents the integrated value of the peaks of the structural units derived from aliphatic diol condensation products, and d represents the integrated value of the peaks of the decarboxylated end groups. In $^1$H-NMR of the polyethylene furanoate raw material, the peak of the ethylene glycol (aliphatic diol) structural unit is observed around 4.6 to 4.7 ppm, the peak of the hydroxyl end group is around 3.97 to 4.0 ppm, the peak of the diethylene glycol (aliphatic diol condensation product) structural unit is around 3.88 to 3.9 ppm, and the peak of the decarboxylated end group is around 6.53 to 6.5 ppm.

The carboxyl end group content can be determined by the following method. First, 0.3 to 0.4 g of the polyethylene furanoate raw material is weighed accurately, to which 25 mL of benzyl alcohol is added and stirred at 195° C. for 7 minutes until complete dissolution is visually confirmed. Next, this solution is cooled with an ice bath, followed by addition of 2 mL of ethanol and titration using an automatic titrator "GT-200" manufactured by Mitsubishi Chemical Corporation using a 0.01 N NaOH/benzyl alcohol solution. Then, considering the titer as A ml, and the blank value obtained from a similar measurement with the solvent alone as B ml, they are substituted into the following formula to calculate the carboxyl end group content:

$$\text{The carboxylic acid end group content (μeq/g)}=(A-B)\times F\times 10/W$$

A [ml]: measurement titer

B [ml]: blank titer

F: the factor of the 0.01 N NaOH/benzyl alcohol solution

W [g]: the weight of the sample

The ratio of the decarboxylated end group content to the total of the decarboxylated end group content and the carboxyl end group content (hereinafter may be referred to as "relative decarboxylated end group content") is preferably 0.5 or less, and more preferably 0.3 or less.

When the relative decarboxylated end group content in the polyethylene furanoate raw material is not more than the specific value described above, solid phase polymerization following the polycondensation reaction is likely to proceed rapidly. The relative decarboxylated end group content in the polyethylene furanoate raw material can be adjusted by devising the conditions of esterification or transesterification and polycondensation reactions as described above. To reduce the decarboxylated end group content, esterification or transesterification is preferably performed such that the reaction rate is higher. Specifically, the reaction time at lower temperature is preferably longer. This allows the reaction rate of esterification to increase and by-products to be less likely to occur. The polycondensation reaction is preferably performed from a lower temperature at the start of the reduced pressure because of less tendency to produce by-products. Accordingly, by performing the esterification or transesterification and polycondensation reactions under the preferred conditions as described above, determining the relative decarboxylated end group content of the manufactured polyethylene furanoate raw material, and selecting a polyethylene furanoate raw material having a desired relative content, a polyethylene furanoate raw material in which the relative decarboxylated end group content is a specific amount or less can be obtained.

<Solid Phase Polymerization>

As described above, the polyethylene furanoate raw material obtained by the polycondensation reaction is preferably further subjected to solid phase polymerization to increase the molecular weight and increase the intrinsic viscosity. The reaction temperature of solid phase polymerization is not particularly limited as long as it is not higher than the melting point of the polyethylene furanoate resin. Higher temperature is likely to increase the molecular weight and the intrinsic viscosity of polyethylene furanoate. Specifically, the reaction temperature is preferably 80° C. or higher, more preferably 100° C. or higher, and still more preferably 120° C. or higher. At the same time, the reaction temperature is also preferably lower than the reaction temperature of the polycondensation reaction because of less tendency of thermal decomposition of polyethylene furanoate or side reactions, low carboxyl group end concentration, less coloring, and more tendency to obtain polyester having higher molecular weight.

The method of solid phase polymerization is not particularly limited, and may be, for example, a method in which the polyethylene furanoate raw material in a state of pellet or powder is heated under an inert gas atmosphere or under a reduced pressure. The reaction may be performed with the pellets or powder being left to stand or being stirred. In the case of stirring, stirring may be done using a stirring blade placed in the reaction vessel or by moving the reaction vessel.

The reaction time is usually 0.5 hours or more, preferably 1 hour or more, and more preferably 2 hours or more. The reaction time is also preferably 60 hours or less, more preferably 50 hours or less, and still more preferably 45 hours or less. Longer reaction times tend to result in polyethylene furanoate having higher molecular weight and excellent mechanical properties. Shorter reaction times tend to result in less tendency of coloring of polyethylene furanoate to occur.

<Method of Manufacturing Highly-Viscous Polyester>

As described above, the polyethylene furanoate of the present embodiment preferably has higher intrinsic viscosity, and particularly preferably an intrinsic viscosity of 0.95 dl/g or more. Such highly-viscous polyethylene furanoate can be obtained by subjecting the polyethylene furanoate raw material obtained by the polycondensation reaction described above to solid phase polymerization (hereinafter, this polyester after solid phase polymerization may be referred to as "high-molecular-weight polyethylene furanoate" or "highly-viscous polyethylene furanoate").

In particular, a polyethylene furanoate raw material manufactured using a titanium catalyst, having an intrinsic viscosity of from 0.65 dl/g to 0.85 dl/g and an above-described decarboxylated end group content of 20 eq/t or less can be used as the polyethylene furanoate raw material and subjected to solid phase polymerization to obtain highly-viscous polyethylene furanoate that could not conventionally be obtained (hereinafter, this method of manufacturing highly-viscous polyethylene furanoate after solid phase polymerization may be referred to as "the method of manufacturing highly-viscous polyethylene furanoate of the present embodiment").

Thus, the method of manufacturing highly-viscous polyethylene furanoate of the present embodiment comprises a polyethylene furanoate raw material manufacturing step in which a polyethylene furanoate raw material is manufactured using a titanium catalyst, and a solid phase polymerization step in which the polyethylene furanoate raw material is subjected to solid phase polymerization, wherein in the solid phase polymerization step, polyethylene furanoate having an intrinsic viscosity of from 0.65 dl/g to 0.85 dl/g and a decarboxylated end group content of 20 eq/t or less is subjected to solid phase polymerization.

To obtain highly-viscous polyethylene furanoate by solid phase polymerization as described above, the relative decarboxylated end group content of the polyethylene furanoate raw material is preferably a specific amount. Thus, the method of manufacturing highly-viscous polyethylene furanoate of the present embodiment preferably uses polyethylene furanoate as a polyethylene furanoate raw material, in which the relative decarboxylated end group content as described above is a specific amount.

The method of manufacturing highly-viscous polyethylene furanoate of the present embodiment comprises an esterification or transesterification reaction step of 2,5-furandicarboxylic acid component and 1,2-ethanediol, a polycondensation reaction step, and a solid phase polymerization step. The present inventors have found that the reaction in the polycondensation reaction step can be performed using a titanium catalyst, and the conditions of the esterification or transesterification reaction and the polycondensation reaction can be adjusted such that the decarboxylated end group content is controlled within a specific range to obtain polyethylene furanoate having high intrinsic viscosity that cannot have been obtained by conventional methods, which is effective in solving the problems described above.

In other words, the present inventors have found that the problems described above can be solved by a method of manufacturing highly-viscous polyethylene furanoate comprising a raw material manufacturing step in which a polyethylene furanoate raw material having a structural unit derived from 2,5-furandicarboxylic acid and a structural unit derived from 1,2-ethanediol is manufactured; and a solid phase polymerization step in which the polyethylene furanoate raw material is subjected to solid phase polymerization, wherein the raw material manufacturing step is performed by using a titanium catalyst, wherein the polyethylene furanoate raw material used in the solid phase polymerization step has an intrinsic viscosity is from 0.65 dl/g to 0.85 dl/g, and the decarboxylated end group content is 20 eq/t or less, as measured by the methods described below.

The intrinsic viscosity of the polyethylene furanoate raw material is preferably higher in that a desired highly-viscous polyethylene furanoate tends to be obtained by short-time solid phase polymerization. However, the intrinsic viscosity of the polyethylene furanoate raw material is preferably lower in that a polyethylene furanoate raw material that is excellent in color tone and have lower carboxylic acid end and decarboxylated end contents tends to be obtained by a short-time polycondensation reaction, and the subsequent solid phase polymerization tends to proceeds quickly. Specifically, the intrinsic viscosity of the polyethylene furanoate raw material is 0.65 dl/g or more, and preferably 0.67 dl/g or more, while is 0.85 dl/g or less, and preferably 0.83 dl/g or less.

As described above, to obtain highly-viscous polyethylene furanoate by solid phase polymerization, the decarboxylated end group content of the polyethylene furanoate raw material, that is produced by a decarboxylation reaction of furandicarboxylic acid, is preferably lower. Specifically, polyester is usually used having a decarboxylated end group content of 20 eq/t or less, and preferably 10 eq/t or less. When the decarboxylated end group content of the polyethylene furanoate raw material is not more than a specific amount, solid phase polymerization for high molecular wight proceeds smoothly and the viscosity of polyethylene furanoate can be sufficiently increased. The method of manufacturing a polyethylene furanoate raw material having a decarboxylated end group content that is not more than a specific amount is as described above.

In addition, a polyethylene furanoate raw material having a less carboxyl end group content than the hydroxyl end group content is more preferably used because the progress of solid phase polymerization is speeded up. The carboxyl end group content in the polyethylene furanoate raw material is 5 eq/t or more, and preferably 10 eq/t or more, and is 60 eq/t or less, and preferably 50 eq/t or less. The hydroxyl end group content is 30 eq/t or more, preferably 40 eq/t or more, and is 120 eq/t or less, and preferably 100 eq/t or less. The method of manufacturing a polyethylene furanoate raw material that satisfies such a relationship between the end group contents is as described above.

In order to obtain polyethylene furanoate having particularly high intrinsic viscosity, pre-crystallization is preferably performed before solid phase polymerization. Specifically, the molecular weight of polyethylene furanoate increases by performing solid phase polymerization at about 190 to 210° C. In the process of reaching this temperature range, it is preferable to gradually increase the temperature from about 100° C. It is particularly preferable that heating is done at 120° C. for about 1 to 6 hours, to allow polyethylene furanoate to be crystallized. Sufficient time for such pre-crystallization results in less tendency for pellets, particles, or the like to be fused, allowing the subsequent solid phase polymerization reaction to be advanced smoothly. In the case where there is fusion during pre-crystallization, a step of removing and separating the fusion is performed as appropriate.

<Intrinsic Viscosity>

As described above, the method of manufacturing highly-viscous polyethylene furanoate of the present embodiment can manufacture polyethylene furanoate having high intrinsic viscosity that cannot have been obtained conventionally. The polyethylene furanoate of the present embodiment is preferably highly-viscous polyethylene furanoate having an intrinsic viscosity of 0.95 dl/g or more. The intrinsic viscosity of the highly-viscous polyethylene furanoate is preferably more than 0.95 dl/g, more preferably 1.0 dl/g or more, still more preferably more than 1.00 dl/g, and most preferably 1.1 dl/g or more. The intrinsic viscosity of the highly-viscous polyethylene furanoate is also preferably 1.5 dl/g or less, and more preferably 1.3 dl/g or less. In other words, the intrinsic viscosity of the polyethylene furanoate of the present embodiment is preferably from 0.95 dl/g to 1.5 dl/g. When the intrinsic viscosity is within such a range, polyethylene furanoate that is excellent in both stretch moldability and blow moldability can be obtained. The intrinsic viscosity is preferably higher in that the oxygen barrier properties tend to be improved when the polyethylene furanoate of the present embodiment is used in combination with other thermoplastic resin as described below.

When the intrinsic viscosity is within the range described above, a molded product having excellent strain hardening properties, small variation in the thickness, and good impact resistance tends to be obtained. A molded product showing excellent impact resistance particularly when filled with liquid that produces an internal pressure, such as carbonated liquid, also tends to be obtained. In addition, because of the smaller variation in the thickness and the possibility of making uniform thin film, the use of the polyethylene furanoate of the present embodiment enables weight reduction of bottles and reduction of environmental impact. Further, extrusion can be easily made without applying high pressure during molding.

The reason why high intrinsic viscosity tends to allow polyethylene furanoate to develop strain hardening properties is inferred as follows. Strain hardening is a phenomenon where the viscosity of a resin significantly increases as compared to the linear viscosity depending of the stretching rate. Usually, in stretching processes, stress tends to be concentrated in areas with thin thicknesses, leading to increased deformation and greater thickness irregularity. However, when polymer having strain hardening properties is stretched, the area that is thinner shows higher viscosity and is likely to show uniform thickness, which is suitable for stretch molding.

<Strain Hardening Properties>

The strain hardening properties can be quantified by the stress difference as measured by a tensile test as described below. The stress difference of the polyethylene furanoate of the present embodiment is preferably 5 N/mm$^2$ or more, and more preferably 8 N/mm$^2$ or more. At the same time, the stress difference is also preferably 50 N/mm$^2$ or less, more preferably 40 N/mm$^2$ or less, and still more preferably 30 N/mm$^2$ or less. When the stress difference is within the range described above, strain hardening properties can be developed, and bottles having a uniform thickness can be obtained by blow molding. Here, the strain hardening properties can be adjusted by changing the polymerization temperature, the polymerization time, the pressure during the polymerization reaction, or the like in manufacturing of the polyethylene furanoate. The strain hardening properties of the polyethylene furanoate of the present embodiment can be adjusted in the same manner as the method of adjusting the intrinsic viscosity of the polyethylene furanoate as described above.

<Glass Transition Temperature (Tg)>

The glass transition temperature of the polyethylene furanoate of the present embodiment is preferably from 50° C. to 150° C. The glass transition temperature is more preferably 60° C. or higher. At the same time, the glass transition temperature is also more preferably 130° C. or lower. When the glass transition temperature of the polyethylene furanoate is within the range described above, deformation due to the pressure difference between the inside and outside of the bottle is unlikely to occur even when the content of the bottle is a sparkling substance such as carbonated water, and deformation is unlikely to occur even when the bottle is stored under high-temperature environments.

The glass transition temperature of the polyethylene furanoate of the present embodiment can be adjusted, for example, by selecting the type of other aliphatic diol component.

The glass transition temperature can be measured using differential scanning calorimetry according to the method in JIS K7121-1987. Specifically, the temperature of the polyethylene furanoate was raised from 25° C. to the melting point +30 to 60° C., then lowered to 25° C., and again raised to the melting point+30 to 60° C. Here, the temperature raising and lowering rates are 10° C./min. The midpoint glass transition temperature in the second temperature raising is considered as the glass transition temperature.

<Decarboxylated End Group Content>

The above-described decarboxylated end group content contained in the polyethylene furanoate of the present embodiment is preferably lower because highly-viscous polyethylene furanoate tends to be obtained by solid phase polymerization. Specifically, the decarboxylated end group content is preferably 20 eq/t or less, and more preferably 10 eq/t or less. The decarboxylated end group content is also usually 0.01 eq/t or more. The method of adjusting the decarboxylated end group content of polyethylene furanoate before solid phase polymerization is as described above. The decarboxylated end group content of polyethylene furanoate obtained by solid phase polymerization can be adjusted, for example, by changing the decarboxylated end group content contained in the polyethylene furanoate raw material before solid phase polymerization.

[Polyester Composition]

Another aspect of the present invention is a polyester composition comprising the polyethylene furanoate of the present embodiment described above (hereinafter may also be referred to as "polyester composition of the present embodiment").

The polyester composition of the present embodiment preferably comprises the polyethylene furanoate of the present embodiment, and a thermoplastic resin other than it (hereinafter may also be referred to as "other thermoplastic resin"). Inclusion of the polyethylene furanoate of the present embodiment and other thermoplastic resin can improve the strain hardening properties, allowing for easy stretch molding.

<Other Thermoplastic Resin>

The other thermoplastic resin is a thermoplastic resin other than the above-described polyethylene furanoate of the present embodiment. Examples of the other thermoplastic resin include thermoplastic polyester resins other than the polyethylene furanoate of the present embodiment (hereinafter may be also referred to as "other polyester"), crosslinking thermoplastic resins, acryls, and polycarbonates. Among these, the other thermoplastic resin is preferably at least any of the other polyesters and the crosslinking thermoplastic resins because of excellent strain hardening properties or the like.

The polyester composition of the present embodiment preferably comprises a high amount of the polyester of the present embodiment because of excellent gas barrier properties and blow moldability, and at the same time preferably comprises high amount of other polyester because of excellent strain hardening properties and creep resistance.

The other thermoplastic resins may be used alone or in any combination of two or more at any ratio.

<Other Polyester>

The other polyester is polyester having a structural unit derived from diol and a structural unit derived from dicarboxylic acid, which is other than the above-described polyethylene furanoate of the present embodiment.

Examples of dicarboxylic acid constituting the dicarboxylic acid unit contained in the other polyester include o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid, decamethylene carboxylic acid, and anhydrides and lower alkyl esters thereof. The other polyester preferably comprises such a structural unit derived from dicarboxylic acid, other than 2,5-furandicarboxylic acid unit as a main dicarboxylic acid unit. A terephthalic acid unit is particularly preferably contained as the dicarboxylic acid unit.

On the other hand, examples of diol constituting the diol unit contained in the other polyester include aliphatic diols, such as chain diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentylglycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and polytetramethylene glycol; and cyclic diols such as 1,4-cyclohexanediol, 1,4-cyclohexanedimethanol, 2,2-bis(4-hydroxycyclohexyl)propane, and alkylene oxide adducts of 2,2-bis(4-hydroxycyclohexyl)propane. Among these, other polyester preferably has a structural unit derived from an aliphatic diol as a diol unit, and more preferably a structural unit derived from an aliphatic chain diol.

<Crosslinking Thermoplastic Resin>

Use of a crosslinking thermoplastic resin in combination that has a functional group capable of reacting with a carboxyl group or a hydroxyl group contained in the polyester composition can also improve the strain hardening properties. Examples of the functional group capable of reacting with a carboxyl group or a hydroxyl group include an epoxy group, an oxazoline group, a carboxyl group, and a carbodiimide group. These functional groups preferably exist on side chains of the thermoplastic resin. The presence of these functional groups on the side chains results in formation of a branched structure, which delays relaxation after stretching of the molecule during stretch molding and thus improve strain hardening properties.

<Composition Comprising Polyester of the Present Embodiment as Main Component>

The composition particularly having excellent gas barrier properties and blow moldability preferably have more polyethylene furanoate of the present embodiment than other thermoplastic resin. In other words, the polyester composition of the present embodiment preferably is a polyester composition comprising 50% by weight or more of polyethylene furanoate, which comprises a thermoplastic resin other than the polyethylene furanoate. The polyethylene furanoate of the present embodiment preferably accounts for the greatest proportion of the polyester composition of the present embodiment. Specifically, the amount of the polyethylene furanoate of the present embodiment in the polyester composition is usually 50% by weight or more, preferably 55% by weight or more, more preferably 60% by weight or more, still more preferably 65% by weight or more, and particularly preferably 70% by weight or more. The upper limit of the amount of the polyethylene furanoate of the present embodiment is 100% by weight, but is preferably 99% by weight or less, more preferably 95% by weight or less, and still more preferably 90% by weight or less, in that effects by containing other components are likely to develop. In other words, the amount of other thermoplastic resin in the polyester composition of the present embodiment in this case is preferably 1% by weight or more, more preferably 5% by weight or more, and still more preferably 10% by weight or more, while the amount is preferably 50% by weight or less, more preferably 45% by weight or less, still more preferably 40% by weight or less, and particularly preferably 30% by weight or less. When the other thermoplastic resin is polyester, the amount particularly preferably is from 1% by weight to 30% by weight, and more preferably from 5% by weight to 30% by weight.

When the composition comprising a great amount of the polyethylene furanoate of the present embodiment comprises other thermoplastic resin, the other thermoplastic resin preferably is a crosslinking thermoplastic resin, or polyester having at least any structural unit of 1,4-butanediol unit and polytetramethylene glycol unit as a diol unit. The later polyester particularly preferably has a 1,4-butanediol unit, and more particularly preferably has both a 1,4-butanediol unit and a polytetramethylene glycol unit. In other words, the polyester composition of the present embodiment comprises a great amount of the polyethylene furanoate of the present embodiment, and further comprise a crosslinking thermoplastic resin and/or a thermoplastic polyester resin other than the polyethylene furanoate of the present embodiment, wherein the other thermoplastic polyester resin preferably comprise polyester having a terephthalic acid unit as a dicarboxylic acid unit and at least any structural unit of a 1,4-butanediol unit and a polytetramethylene glycol unit as a diol unit, and wherein more preferably 50% by weight or more of the polyester of the present embodiment is contained.

When the composition comprising a great amount of the polyester of the present embodiment comprises a crosslinking thermoplastic resin, the amount of the crosslinking thermoplastic resin is preferably larger in that excellent strain hardening properties are obtained. At the same time, the amount of the crosslinking thermoplastic resin is preferably smaller in that gelling or seeding is less likely to occur, and the yield is likely to be increased. Specifically, the amount of the crosslinking thermoplastic resin is preferably 0.01% by weight or more, more preferably 0.05% by weight or more, and still more preferably 0.1% by weight. At the same time, the amount is preferably 20% by weight or less, more preferably 10% by weight or less, and still more preferably 5% by weight or less.

Thus, the polyester composition of the present embodiment can develop sufficient strain hardening properties by using a combination of the polyethylene furanoate of the present embodiment and other polyester even when the intrinsic viscosity or the glass transition temperature of the polyester of the present embodiment as described above is out of the preferred range.

<Composition Comprising Other Thermoplastic Resin as Main Component>

In particular, the composition having excellent strain hardening properties and creep resistance preferably comprises more other thermoplastic resin than the polyethylene furanoate of the present embodiment. In other words, the other thermoplastic resin preferably accounts for the greatest proportion of the polyester composition of the present embodiment. Specifically, the amount of the other thermoplastic resin in the polyester composition is usually 50% by weight or more, preferably 70% by weight or more, and more preferably 80% by weight or more. At the same time, the amount of the other thermoplastic resin in this case is preferably 99% by weight or less, and more preferably 95% by weight or less. Particularly when the other thermoplastic resin is polyethylene terephthalate, the amount of polyethylene terephthalate is preferably from 80% by weight to 99% by weight.

The other thermoplastic resins contained in the composition in a large amount are preferably polyester resins, and more preferably polyethylene terephthalate (PET) and polybutyrene terephthalate because of excellent strain hardening properties and stretch moldability. Polyethylene terephthalate is particularly preferable because the creep resistance of the blow-molded bottle tends to be improved, while polybutyrene terephthalate is particularly preferable because the strain hardening properties tend to be improved.

The polyethylene furanoate of the present embodiment contained in a small amount in the composition preferably shows particularly higher intrinsic viscosity because the effect of the combination of improving the gas barrier properties tends to be achieved. In addition, the glass transition temperature is preferably within the preferred range described above. Specifically, the polyethylene furanoate of the present embodiment contained in a small amount is polyester having a structural unit derived from 2,5-furandicarboxylic acid and a structural unit derived from aliphatic diol, preferably having an intrinsic viscosity of from 0.95 dl/g to 1.50 dl/g, and more preferably having a glass transition temperature of from 50° C. to 150° C.

Thus, another aspect of the present invention is a polyester composition comprising polyethylene furanoate having an intrinsic viscosity from 0.95 dl/g to 1.50 dl/g or less, and other thermoplastic resin than the polyethylene furanoate. Preferably, such a polyester composition comprises 1 to 20% by weight of the polyethylene furanoate, and further comprise polyethylene terephthalate.

<Additive>

In the manufacturing of the polyester composition, various additives, for example, heat stabilizers, antioxidants, hydrolysis inhibitors, crystal nucleating agents, flame retardants, antistatic agents, mold release agents, and ultraviolet absorbers may be used without impairing the properties.

These additives may be added to the reactor before the polymerization reaction of the polyester, or may be added to the conveyor or the like from the start of the polymerization reaction before the end of the polymerization reaction, or may be added after the end of the polymerization reaction before extraction of the product. Alternatively, it may be added to the extracted product.

In molding the polyester composition, it may be molded with addition of an impact resistance modifier, a crystal nucleating agent, a reinforcing agent, a filler, or the like in addition to the various additives described above. When using additives and the like, the additives may be used alone or in any combination of two or more at any ratio.

<Impact Resistance Modifier>

The polyester composition of the present embodiment may comprise an impact resistance modifier. Inclusion of an impact resistance modifier can improve the mechanical properties. When an impact resistance modifier is contained, the amount is preferably from 0.01% by weight to 10% by weight.

Examples of the impact resistance modifier include butadiene rubbers, acrylic rubbers, and silicone-acrylic composite rubbers. Among these, core-shell type impact resistance modifiers thereof such as METABLEN (Mitsubishi Chemical Corporation) and KANEACE (KANEKA CORPORATION) are suitably used.

A filler may be used in the manufacture of the polyester composition. The filler may be inorganic or organic. The amount of the filler in the polyester composition is preferably selected within the range where the effect of addition of the filler is sufficiently achieved, and the tensile elongation and impact resistance of the polyester composition are maintained.

Examples of the inorganic filler include silicates such as anhydrous silica, mica, talc, titanium oxide, calcium carbonate, diatomaceous earth, allophane, bentonite, potassium titanate, zeolite, sepiolite, smectite, kaolin, kaolinite, glass, limestone, carbon, wollastonite, calcined perlite, calcium silicate, and sodium silicate; hydroxides such as aluminum oxide, magnesium carbonate, and calcium hydroxide; and salts such as ferrous carbonate, zinc oxide, iron oxide, aluminum phosphate, and barium sulfate.

In the case of the polyester composition comprising an inorganic filler, the amount of the inorganic filler in the polyester composition is usually 1% by weight or more, preferably 3% by weight or more, and still more preferably 5% by weight or more. The amount is also usually 80% by weight or less, preferably 70% by weight or less, and more preferably 60% by weight or less.

Examples of the organic filler include raw starch, processed starch, pulp, chitin and chitosan, coconut husk powder, bamboo powder, bark powder, and powder of kenaf, straw, or the like. The examples also include nanofiber cellulose, which is pulp or other fiber that have been disintegrated to the nano-level.

In the case of the polyester composition comprising an organic filler, the amount of the organic filler in the polyester composition is usually 0.1% by weight or more, and preferably 1% by weight or more. The amount is also usually 70% by weight or less, and preferably 50% by weight or less.

Examples of the crystal nucleating agent include glass fiber, carbon fiber, titanium whisker, mica, talc, boron nitride, $CaCO_3$, $TiO_2$, silica, layered silicate, polyethylene wax, and polypropylene wax, and talc, boron nitride, silica, layered silicate, polyethylene wax, and polypropylene wax are preferable, and talc is especially preferable.

An inorganic filler added to improve the rigidity, an organic stabilizer added as a heat stabilizer, or the like can also contribute to accelerated crystallization. An inorganic substance, an organic foreign substance, or the like due to contamination during the polyester manufacturing or molding process may also be a crystal nucleating agent. Thus, the term "crystal nucleating agent" as used herein refers to particles that are solid at the normal temperature and contribute to accelerated crystallization.

The particle size of the crystal nucleating agent is preferably smaller. The particle size of the crystal nucleating agent is preferably 5 μm or less, more preferably 3 μm or less, still more preferably 1 μm or less, and most preferably 0.5 μm or less. The lower limit of the particle size of the crystal nucleating agent is usually 0.1 μm.

When a crystal nucleating agent is used in manufacturing the polyester composition, the amount is preferably 0.001% by weight or more relative to the polyester composition, more preferably 0.01% by weight or more, and still more preferably 0.1% by weight or more. The upper limit of the amount of the crystal nucleating agent is preferably 30% by weight relative to the polyester, more preferably 10% by weight, still more preferably 5% by weight, and particularly preferably 1% by weight. When the amount of the crystal nucleating agent is within the range described above, the effect of accelerating crystallization is likely to be achieved, and the mechanical properties, flexibility, and the like of the polyester composition also tend to be obtained.

<Method of Manufacturing Polyester Composition>

A known method can be used in manufacturing the polyester composition of the present embodiment. For example, the manufacturing can be done by melt-kneading raw materials using a single or twin screw extruder, a Banbury mixer, or the like and making them into pellets.

<Strain Hardening Properties>

The strain hardening properties of the polyester composition of the present embodiment can be quantified by the stress difference as measured by a tensile test as described below, in the same manner as in the case of the polyethylene furanoate of the present embodiment described above. A preferred range of the stress difference and the reason for that are also as described above for the polyethylene furanoate of the present embodiment. In other words, the stress difference is preferably 5 $N/mm^2$ or more, and more preferably 8 $N/mm^2$ or more. At the same time, the stress difference is also preferably 50 $N/mm^2$ or less, more preferably 40 $N/mm^2$ or less, and still more preferably 30 $N/mm^2$ or less. When the stress difference is within the range described above, strain hardening properties can be developed, and bottles having a uniform thickness can be obtained by blow molding. Here, the strain hardening properties can be adjusted by changing the type (in particular, intrinsic viscosity) or amount of the polyester contained in the polyester composition, the polymerization temperature, the polymerization time, or the pressure during the polymerization reaction in manufacturing each polyester, or the like. The strain hardening properties of the polyester composition of the present embodiment can be higher and adjusted within a preferred range particularly when the polyethylene furanoate of the present embodiment and other thermoplastic resin are combined.

[Method of Determining Composition]

The composition of the polyethylene furanoate and polyester composition can be determined by a conventionally known method. For example, the composition can be determined by separating the composition into components by HPLC (high performance liquid chromatography), and then analyzing the components by a method such as NMR (nuclear magnetic resonance spectroscopy) or GC/MS (gas chromatography/mass spectrometry) after methanolysis.

[Method of Manufacturing Polyester Bottle]

The polyethylene furanoate and polyester composition according to the present embodiment can be suitably used for manufacturing of blow-molded bottles and blow-molded preforms for bottles. The methods of manufacturing a blow-molded bottle and a blow-molded preform for bottles are not particularly limited, and examples thereof are shown below.

The manufacturing of a polyester bottle containing polyethylene furanoate comprises an injection molding step in which a preform is manufactured from a polyester raw material, and a blow molding step in which a bottle is manufactured from the preform. Here, the polyester raw material preferably comprises the above-described polyethylene furanoate of the present embodiment. The manufacturing method is also suitably used in the case where the polyester raw material is the above-described polyester composition of the present embodiment.

The manufacturing of a bottle comprises first melt kneading the polyethylene furanoate or polyester composition and an optionally used other additive using a single or twin screw extruder, a Banbury mixer, or the like and making them into pellets, or directly melt kneading them during injection molding, ejecting the mixture to a mold in a molten state, cooling it, and removing it to form a preform. In the case where the other thermoplastic resin is added, it is preferably made into pellets to be kneaded sufficiently. The resin temperature during the extrusion step is not particularly limited, and is usually from 210 to 290° C., and especially preferably in a range from 230 to 270° C. from the viewpoint of moldability and prevention of thermal degradation.

Next, in the blow molding step, the preform is placed in a mold having a desired shape that has been heated to a predetermined temperature with a heater followed by blowing with compressed air and mounting on a mold, to form a bottle.

The heating temperature of the preform is preferably from 90° C. to 150° C., more preferably from 100° C. to 140° C., and particularly preferably from 110 to 130° C. When the preform is heated at a temperature within the range followed by blowing with compressed air, uniform thickness of the bottle can be achieved in blow molding.

[Polyester Bottle]

Use of the polyethylene furanoate and polyester composition according to the present embodiment can provide a highly-viscous polyester bottle (hereinafter may be referred to as "highly-viscous bottle according to the present embodiment" or the like).

The intrinsic viscosity of the highly-viscous bottle according to the present embodiment is preferably higher from a viewpoint of impact resistance, and at the same time is preferably lower in that a bottle with a desired shape tends to be obtained. Thus, specifically, the intrinsic viscosity is preferably 0.75 dl/g or more, more preferably 0.85 dl/g or more, still more preferably 0.90 dl/g or more, and particularly preferably 0.92 dl/g or more. At the same time, the intrinsic viscosity is also preferably 1.2 dl/g or less, and more preferably 1.15 dl/g or less. Here, the intrinsic viscosity of the bottle is measured using a Ubbelohde viscometer at 30° C. after dissolving 0.25 g of the bottle fragment in 50 ml of a mixed solvent of phenol/1,1,2,2-tetrachloroethane=50/50 (weight ratio). In this case, the Huggins constant is 0.32.

The degree of crystallinity of the highly-viscous bottle according to the present embodiment is preferably higher from a viewpoint of creep resistance, and at the same time is preferably lower from a viewpoint of transparency. Thus, specifically, the degree of crystallinity is preferably 10% or more, and more preferably 15% or more, and is preferably 40% or less, and more preferably 30% or less.

Here, the degree of crystallinity can be determined after a wide-angle X-ray diffraction analysis, by using the following formula:

Degree of crystallinity (%)=Peak area of crystalline component/(Peak area of crystalline component+Peak area of amorphous component)×100

Use of the polyethylene furanoate and polyester composition according to the present embodiment can provide a bottle having excellent strain hardening properties, small thickness irregularity, and good creep resistance and impact resistance. The blow-molded bottle manufactured by using the polyethylene furanoate and polyester composition according to the present embodiment has excellent gas barrier properties, creep resistance, and impact resistance, and thus is suitably used as a bottle for beverage such as alcohol beverage, carbonated beverage, or hot beverage. Thus, the bottle (blow-molded bottle) according to the present embodiment can be filled with beverage to manufacture a beverage product.

The blow-molded bottle can have various shapes depending on the shape of the mold to be used. The shape of the blow-molded bottle is not particularly limited as long as, when the bottle is for beverage, it enables holding the beverage. In particular, the blow-molded bottle, when molded into an appropriate shape with uniform and sufficiently thick wall, is suitable for carbonated liquid such as carbonated beverage such as beer and champagne; and hot beverage such as tea and coffee.

When bottles are filled with such a liquid, the bottle mouse is usually sealed with a resin cap or the like, so that the pressure inside the bottle (internal pressure) is higher than that outside the bottle. Thus, to box, transport, display the bottles in stores, and the like in an upright position under this high internal pressure, the bottom of the bottle preferably has a pressure-resistant shape to prevent deformation due to the internal pressure. Since deformation of the bottom and body of bottles generally involves the creep phenomenon (irreversible deformation due to continuous stress), there is a commonality in wall thickness and shape suitable for these bottles. Therefore, hereinafter, bottles used to be filled with carbonated liquid, hot beverage, or the like may be referred to as "heat and pressure-resistant bottle." Thus, the polyethylene furanoate of the present embodiment and the polyester composition of the present embodiment are suitable for heat and pressure-resistant bottles.

As the pressure-resistant shape of the bottle of the heat and pressure-resistant bottle, for example, a petaloid shape, a so-called champagne bottom shape that is a dome shape facing toward the inside of the container, or a shape with a concavo-convex shape in the center of the bottom can be used. When the average wall thickness is large, deformation or burst of the bottle due to the internal pressure is unlikely to occur. Specifically, depending on the internal pressure, the average wall thickness of the bottle body is preferably 0.20 mm or more, more preferably 0.25 mm or more, and still more preferably 0.30 mm or more. At the same time, the average wall thickness is preferably 0.70 mm or less from the viewpoint of bottle moldability.

Use of the polyethylene furanoate and polyester composition according to the present embodiment makes it possible to form a uniform thin film with less uneven wall thickness and provide a lightweight heat and pressure-resistant bottle. Specifically, the weight/internal capacity of the bottle is preferably 10 g/L or more, more preferably 20 g/L or more, still more preferably 30 g/L or more, and particularly preferably 50 g/L or more, and at that same time is also preferably 200 g/L or less, more preferably 150 g/L or less, and particularly preferably 120 g/L or less.

Since use of the polyethylene furanoate and polyester composition according to the present embodiment can provide a bottle having a uniformly thin wall with excellent gas barrier properties, the polyethylene furanoate and polyester composition according to the present embodiment are particularly suitable for bottles used to be filled with carbonated liquid such as carbonated beverage. The blow-molded bottle manufactured by using the polyethylene furanoate and polyester composition according to the present embodiment is excellent in creep resistance and impact resistance in the case where it is filled with carbonated liquid. Specifically, the bottle is used preferably as a bottle used to be filled with liquid containing 1 to 10 GV of carbonic acid gas, more preferably as a bottle used to be filled with liquid containing 1 to 5 GV of carbonic acid gas, still more preferably as a bottle used to be filled with liquid containing 1 to 3 GV of carbonic acid gas, and particularly preferably as a bottle used to be filled with liquid containing 1 to 2 GV of carbonic acid gas.

The polyethylene furanoate and polyester composition according to the present embodiment are excellent in oxygen barrier properties. Thus, when the polyethylene furanoate and polyester composition according to the present embodiment is used for blow-molded bottles, the bottles are suitable for alcohol beverage, such as wine bottles. In particular, the bottles have excellent gas barrier properties as compared with conventional PET bottles for alcohol beverage, and thus can be used without diamond-like carbon coating.

Bottles in which the polyethylene furanoate according to the present embodiment has a glass transition temperature of 50° C. or higher are suitable as bottles used to be filled with sparkling substance such as carbonated beverage because deformation due to pressure difference between the inside and outside of the bottle is unlikely to occur. In addition, such bottles are suitable as bottles for hot beverage because deformation is unlikely to occur even when they are stored under high-temperature environments.

[Biaxially Stretched Film]

The polyethylene furanoate and polyester composition according to embodiments of the present invention as described above can be suitably used as biaxially stretched films. The method of manufacturing biaxially stretched films is not particularly limited, and examples thereof will be described below.

First, using the polyethylene furanoate or polyester composition, it is extruded from a die to obtain a molten sheet, which is cooled and solidified with a cooling roll to obtain an unstretched sheet. In this case, it is necessary to increase the adhesion between the sheet and the rotating cooling drum to improve the flatness of the sheet, and an electrostatic application adhesion method and/or a liquid coating adhesion method are preferably employed.

Next, the obtained unstretched sheet is stretched biaxially. In this case, the unstretched sheet is first stretched in one direction using a roll- or tenter-type stretching machine. The stretching temperature is usually from 80 to 140° C., and preferably from 85 to 120° C. The fold-stretching is usually from 2.5 to 7 times, and preferably from 3.0 to 6 times. Next, the temperature of stretching orthogonal to the direction of the first stretching is usually from 70 to 170° C., and the fold-stretching is usually from 3.0 to 7 times, and preferably from 3.5 to 6 times.

Subsequently, the resulting product was heated at a temperature from 180 to 270° C. under tension or relaxation of 30% or less to obtain a biaxially oriented film. For stretching, a method in which stretching in one direction is made in two or more steps may be used. In this case, stretching is preferably performed such that each fold-stretching in the two directions is finally within the ranges described above.

A simultaneous biaxial stretching method can be used in manufacturing a biaxially stretched film. The simultaneous biaxial stretching method is a method of simultaneously stretching an unstretched sheet as described above in two directions in a state where the temperature is controlled usually within 70 to 120° C., preferably within 80 to 110° C. With respect to the fold-stretching, the fold-area change is preferably from 4 to 50 times, more preferably from 7 to 35 times, and still more preferably from 10 to 25 times. Subsequently, the resulting product was heated at a temperature from 170 to 250° C. under tension or relaxation of 30% or less to obtain a stretched oriented film. Conventional known stretching methods such as screw, pantograph, and linear drive systems can be used for simultaneous biaxial stretching equipment that employs the stretching method described above.

When the so-called coating and stretching method (in-line coating), in which priming or hard coating is applied to the film surface during the stretching process of the biaxially stretched film described above, it is preferable to apply a coating liquid for forming a primer or hard coat layer on the sheet after uniaxial stretching. When a primer or hard coat layer is provided on a film by the coating and stretching method, the coating can be applied simultaneously with stretching and the thickness of the coated layer can be reduced according to the fold-stretching, making it possible to produce a film suitable as a biaxially stretched film.

EXAMPLES

The present invention will be described in more detail below with reference to Examples, but is not limited to Examples below without departing from the spirit and scope of the present invention.

The evaluation methods in the following Examples and Comparative Examples are as described below.

(1) Intrinsic Viscosity of Polyester

Measurements were made using an Ubbelohde viscosity tube for a solution at 30° C. obtained by accurately weighing 0.25 g of polyester, then adding it to and dissolving it in 50 ml of a mixed solvent of phenol/1,1,2,2-tetrachloroethane=50/50 (weight ratio). The Huggins constant was 0.32.

(2) Glass Transition Temperature of Polyester

The glass transition temperature was measured using a differential scanning calorimeter "DSC7000x" (Hitachi High-Tech Science Corporation) by the method according to JIS K7121-1987. Specifically, the temperature of the polyester was raised from 25° C. to 260° C., then lowered to 25° C., and again raised to 260° C. Here, the temperature raising and lowering rates were 10° C./min. The midpoint glass transition temperature in the second temperature raising was considered as the glass transition temperature.

(3) End Group Content of Polyester

The decarboxylated end group content and the hydroxyl end group content of the polyester was determined by collecting 20 mg of the polyester, dissolving it in 1 g of a mixed solvent of deuterated chloroform/hexafluoroisopropanol $d_2$ (the weight ratio is 2/1), further adding 60 μl of pyridine-$d_5$ to prepare a sample, and performing $^1$H-NMR analysis on the sample using a 400 MHz nuclear magnetic resonance apparatus manufactured by Brucker.

Specifically, through the $^1$H-NMR analysis, the decarboxylated end group content and the hydroxyl end group content of the polyester can be calculated using the following formulae:

$$\text{Decarboxylated end group content (eq/t)}=4d/(182a+226c)\times10^6$$

$$\text{Hydroxyl end group content (eq/t)}=2b/(182a+226c)\times10^6$$

In the formulae, a represents the integrated value of the peaks of the ethylene glycol structural units, b represents the integrated value of the peaks of the hydroxyl end groups, c represents the integrated value of the peaks of the diethylene glycol structural units, and d represents the integrated value of the peaks of the decarboxylated end groups. In $^1$H-NMR, the peak of the ethylene glycol was observed around 4.6 to 4.7 ppm, the peak of the hydroxyl end group was around 3.97 to 4.0 ppm, the peak of the diethylene glycol was around 3.88 to 3.9 ppm, and the peak of the decarboxylated end group was around 6.53 to 6.5 ppm.

The carboxyl end group content was determined by the following method. First, 0.3 to 0.4 g of the polyester was weighed accurately, to which 25 mL of benzyl alcohol was added and stirred at 195° C. for 7 minutes until complete dissolution was visually confirmed. Next, this solution was cooled with an ice bath, followed by addition of 2 mL of ethanol and titration using an automatic titrator "GT-200" manufactured by Mitsubishi Chemical Analytech Co., Ltd. using a 0.01 N NaOH/benzyl alcohol solution. Then, considering the titer as A ml, and the blank value obtained from a similar measurement with the solvent alone as B ml, they were substituted into the following formula to calculate the carboxyl end group content:

$$\text{The carboxylic acid end group content (μeq/g)}=(A-B)\times F\times10/W$$

A [ml]: measurement titer

B [ml]: blank titer

F: the factor of the 0.01 N NaOH/benzyl alcohol solution

W [g]: the weight of the sample (4) Stress Difference by Tensile Test (Strain Hardening Properties)

Tensile tests were performed under the following conditions according to JIS K7127. The stress difference was defined as the difference between the stress at 100% elongation and the maximum stress. The stress difference of 5 N/mm$^2$ or more was considered good.

Equipment: AG-1000 ARI (Shimadzu Corporation)

Sample size: Width 15 mm×Length 70 mm×Thickness 200 m

Stretching temperature: 90° C.

Distance between chucks: 30 mm

Gauge length: 30 mm

Tensile rate: 200 mm/min

Tensile distance: 160 mm (5) Blow Moldability

The blow moldability was evaluated based on the yield (molding success rate) when the preform for bottles was blow molded using a blow molding machine (FRB-1 manufactured by Frontier inc.). A yield of 100% was evaluated as "○" and a yield of less than 95% was evaluated as "x".

(6) Gas Barrier Properties (Oxygen Permeability)

The oxygen permeability of the blow-molded bottle was measured using an oxygen permeability tester (OX-TRAN2/21 manufactured by Modern Controls, Inc.). The oxygen permeability value was measured after conditioning at 23° C. and 90% RH for 12 hours from the start of the measurement and at 72 hours after the start of the measurement. The oxygen gas barrier property was assessed relative to the oxygen permeability of a general-purpose PET bottle (the 100% polyester (G) bottle obtained in Reference Example 3, described below) which was considered as 1. The oxygen gas barrier properties were considered good when the relative assessment was greater than 1. A relative assessment of 5 or more is particularly preferable because diamond-like carbon coating to improve the gas barrier properties, which is applied to conventional PET bottles to ensure the oxygen barrier properties in wine bottle applications, is no longer necessary.

(7) Creep Resistance

A blow-molded bottle was filled with 2.8 GV carbonated water, capped, immersed in warm water at 40° C. to heat it for 1 hour. Then, the sample was returned to room temperature, and the bottle dimensions (overall height: height from the bottle head to the bottom; body diameter: circumference of the thickest portion of the bottle; capacity: volume of the bottle) were measured. The bottle was evaluated as ◎ if the rate of change was smaller than that of the general-purpose PET bottle; as ○ if the rate of change was equal; and as x if the rate of change was greater. 1 GV is a unit that indicates the state in which 1 L of carbon dioxide gas is dissolved in 1 L of liquid under standard conditions.

(8) Impact Resistance Test

<Water Filling>

A blow-molded bottle was filled with distilled water, capped, and cooled to 5° C. The bottle was then dropped three times continuously from a height of 80 cm in an upright position (the cap side was up). The same sample was dropped three times continuously in an inverted position (the cap side was down). After the test, the bottle was evaluated as ○ if there was no leakage of the liquid content, Δ if the bottle was deformed, and x if there was leakage.

<Carbonated Water Filling>

The bottle that had been evaluated for creep resistance was cooled to 5° C. and subjected to the dropping test in the same manner as in the water filling to evaluate the impact resistance.

(9) Reaction Rate of Esterification Reaction

The reaction rate of the esterification reaction was determined by collecting a reaction solution immediately before vacuum (before the polycondensation step) and analyzing it using $^1$H-NMR. Specifically, 10 to 20 mg of a reaction solution was collected, and dissolved in 1 g of dimethyl sulfoxide-d6, followed by measurement using 400 MHz NMR manufactured by Bruker.

(10) Degree of Crystallinity of Bottle

The wide-angle X-ray diffraction was measured and the degree of crystallinity was calculated. The wide-angle X-ray diffraction analysis was performed using "NANO-Viewer" (Rigaku Corporation), with the X-ray source being CuKα (λ=0.154 nm), the camera length being 74.7 mm, the irradiation time being 45 minutes, and the temperature being 25° C. The profiles obtained from the wide-angle X-ray diffraction measurements were fitted and the degree of crystallinity was determined from the following equation:

Degree of crystallinity (%)=peak area of crystalline component/(peak area of crystalline component+peak area of amorphous component)×100

Reference Example 1

To a reaction vessel equipped with a stirrer, a nitrogen inlet, a heater, a thermometer, a pressure reducing port, 85.7 g of 2,5-furandicarboxylic acid (V & V Pharma Industries), 68.16 g of 1,2-ethanediol (Mitsubishi Chemical Corporation), and 0.029 g of 35% by weight aqueous solution of tetraethylammonium hydroxide were added as raw materials, and the inside of the reaction vessel was changed to nitrogen atmosphere.

Next, the reaction vessel was immersed in an oil bath set at 120° C. and the temperature was raised to 210° C. for 60 minutes while stirring and held at 210° C. for 200 minutes to collect the distillate. The esterification reaction thereof was then advanced. A portion of the reaction solution was taken and analyzed using NMR, and the esterification reaction rate was 92%.

Thereafter, to the reaction solution after the esterification reaction was added 0.71 g of a 5.0% by weight solution of tetrabutyl titanate dissolved in 1,2-ethanediol (the molar ratio of Ti to 2,5-furandicarboxylic acid was 0.00019 mol, the concentration of Ti to the produced polyester was 50 ppm), and the temperature was raised to 260° C. for 1.5 hours while the pressure was gradually reduced from the normal pressure to about 130 Pa for 1.5 hours and then held at 130 Pa. After 3 hours and 46 minutes from the start of the reduced pressure, stirring was stopped, and the pressure was returned to stop the polycondensation reaction. The produced polyester was extracted from the bottom of the reactor in the form of strands, cooled through a cooling water tank, and then cut by a pelletizer to obtain polyester (I) in the form of pellets with about 2 to 3 mm square. The intrinsic viscosity of the polyester (1) was 0.78 dL/g. With respect to the end group content, the carboxyl end group content was 23 eq/t, the hydroxyl end group content was 71 eq/t, and the decarboxylated end group content was 4 eq/t, and the ratio of the decarboxylated end group content to the total of the decarboxylated end group content and the carboxyl end group content was 0.14.

Reference Example 2

Polyester (J) was obtained in the same manner as in Reference Example 1 except that the time period for which the temperature of 210° C. was held in the esterification reaction was changed from 200 minutes to 75 minutes. The esterification reaction rate was 83%. The intrinsic viscosity of the polyester (J) was 0.81 dL/g. With respect to the end group content, the carboxyl end group content was 19 eq/t, the hydroxyl end group content was 38 eq/t, and the decarboxylated end group content was 29 eq/t, and the ratio of the decarboxylated end group content to the total of the decarboxylated end group content and the carboxyl end group content was 0.60. The results from Reference Examples 1 and 2 are collectively shown in Table 1.

[Table 1]

TABLE 1

| | Reference Example 1 | Reference Example 2 |
|---|---|---|
| Heating time at 210° C. in esterification reaction | 200 min | 75 min |
| Reaction rate of esterification reaction | 92% | 83% |
| Decarboxylated end group content of polyester [eq/t] | 4 | 29 |

Table 1 confirms that performing the esterification reaction over a longer period of time allow esterification to be sufficiently advanced so that polyethylene furanoate with reduced decarbonated end group content can be obtained.

Example A1

<Melt Polymerization>

To a reaction vessel equipped with a stirrer, a nitrogen inlet, a heater, a thermometer, a rectifying tower, 42.85 kg of 2,5-furandicarboxylic acid (V & V Pharma Industries), 30.6 L of 1,2-ethanediol (Mitsubishi Chemical Corporation), and 14.3 g of 35% by weight aqueous solution of tetraethylammonium hydroxide were added as raw materials, and the inside of the reaction vessel was changed to nitrogen atmosphere.

Next, the temperature was raised to 200° C. for 2 hours while stirring and held at 200° C. for 2 hours and 30 minutes to collect the distillate. The esterification reaction thereof was then advanced (the total heating time was 4 hours and 30 minutes).

Thereafter, the reaction solution was transferred to a reactor equipped with a pressure reducing port and a stirrer, to which 888.5 g of a 2.0% by weight solution of tetrabutyl titanate dissolved in 1,2-ethanediol while stirring (the molar ratio of Ti to 2,5-furandicarboxylic acid was 0.00019 mol, the concentration of Ti to the produced polyester was 50 ppm). The temperature was raised to 260° C. for 2 hours while the pressure was gradually reduced from the normal pressure to about 130 Pa for 1.5 hours and then held at 130 Pa. After 3 hours and 50 minutes from the start of the reduced pressure, stirring was stopped, and the pressure was returned to stop the polycondensation reaction. The produced polyester was extracted from the bottom of the reactor in the form of strands, cooled through a cooling water tank, and then cut by a pelletizer to obtain polyester (A) in the form of pellets with about 2 to 3 mm square. The intrinsic viscosity of the polyester (A) was 0.74 dL/g. With respect to the end group content, the carboxyl end group content was 29 eq/t, the hydroxyl end group content was 51 eq/t, and the decarboxylated end group content was 5 eq/t, and the ratio of the decarboxylated end group content to the total of the decarboxylated end group content and the carboxyl end group content was 0.14.

<Solid Phase Polymerization>

Th polyester (A) was pre-crystallized by heating while introducing nitrogen gas at a flow rate of 30 L/min. Specifically, 10 kg of the polyester (A) was placed in an inert oven ("DN411I" manufactured by Yamato Scientific Co., Ltd.), heated at 120° C. for 3 hours, and then cooled to the normal temperature (25° C.). Thereafter, the fused pellets were separated from each other. Once again, these pellets were heated at 150° C. for 3 hours and then cooled to the normal temperature (25° C.), thereafter the fused pellets were separated from each other.

Next, 10 kg of the pre-crystallized polyester (A) was placed in the inert oven as described above, and heated sequentially at 120° C. for 1 hour, at 150° C. for 1 hour, at 180° C. for 3 hours, and at 200° C. for 18 hours while introducing nitrogen gas at a flow rate of 30 L/min for solid phase polymerization, to obtain polyester (B). The intrinsic viscosity of the polyester (B) was 1.02 dL/g, and the glass transition temperature was 81.2° C.

The polyester (B) was subjected to a tensile test to evaluate the strain hardening properties. Specifically, on a 150 mm×150 mm PTFE tape (NAFLON TAPE® BTOMBO No. 9001, 0.05 mm thickness, manufactured by NICHIAS CORPORATION), a metal frame (SUS304, 110 mm outer diameter, 70 mm inner diameter, 0.2 mm thickness) after surface release treatment was placed, and 2.0 g of polyester (B) was weighed and placed on the inside of the metal frame, on which another 150 mm×150 mm PTFE tape was placed. The polyester (B) sandwiched by the PTFF tapes was held between two steel plates (160 mm×160 mm, 3 mm thickness) and heat-pressed using a heat press machine (Model IMC-180C manufactured by Imoto Machinery Co., Ltd) to obtain a 70 mm×70 mm×0.2 mm heat-pressed sheet. The heat press temperature was 280° C. and the heat press time period was 1 minute for preheating and 1 minute for pressing.

The PEFE tapes were peeled off from the obtained heat-pressed sheet, and then evaluation by the tensile test was performed. As shown in Table 2, the results showed good strain hardening properties. The polyester (B) had comparable strain hardening properties to polyester (C) and (D) as described below, and thus is considered suitable for blow molding.

Example A2

Polyester (C) having an intrinsic viscosity of 1.12 dl/g, a decarboxylated end group content of 8 eq/t, and a glass transition temperature of 82.6° C. was obtained in the same manner as in Example A1 except that the heating time period at 200° C. at the end of solid phase polymerization was changed from 18 hours to 24 hours. The obtained polyester (C) was processed in the same manner as in Example A1 to prepare a heat-pressed sheet, followed by the tensile test. As shown in Table 2, the results showed good strain hardening properties. The blow moldability of the polyester (C) was good as in Example B1 described below.

Example A3

Polyester (D) having an intrinsic viscosity of 1.23 dl/g, and a glass transition temperature of 83.1° C. was obtained in the same manner as in Example A1 except that the heating time period at 200° C. at the end of solid phase polymerization was changed from 18 hours to 40 hours. The obtained polyester (D) was processed in the same manner as in Example A1 to prepare a heat-pressed sheet, followed by the tensile test. As shown in Table 2, the results showed good strain hardening properties. The blow moldability of the polyester (D) was good as in Example B2 described below.

Comparative Example A1

A heat-pressed sheet was prepared in the same manner as in Example A1 except that the polyester (A) was used instead of the polyester (B), and subjected to the tensile test. As shown in Table 2, the results showed insufficient strain hardening properties. The results also demonstrated unsuitability for blow molding as in Comparative Example B1 described below.

Example A4

Using a small kneading machine (Xplore series MC15, manufactured by Xplore instruments), 11.25 g of the polyester (A) and 3.75 g of polyester (E) as described below were supplied as raw materials from a hopper, and kneaded for 5 minutes at 100 rpm, 240° C. in a nitrogen atmosphere. The resin after kneading was collected from the purging hole to obtain a strand of the polyester composition.

The obtained strand of the polyester composition was heat pressed in the same manner as in Example A1 except that the heat press temperature was 260° C. to produce a heat-pressed sheet. The obtained heat-pressed sheet was subjected to the tensile test. As shown in Table 2, the results showed good strain hardening properties.

Polyester (E): a homopolyester resin of terephthalic acid and 1,4-butanediol, trade name "NOVADURAN 5020" manufactured by Mitsubishi Engineering-Plastics Corporation.

Examples A5 to A8

Polyester compositions were obtained in the same manner as in Example A4 except that the composition of the resin was changed to the compositions shown in Table 2. Heat-pressed sheets thereof were manufactured and subjected to the tensile test. As shown in Table 2, all the results showed good strain hardening properties. Therefore, the heat-pressed sheets are presumed to be suitable for blow molding.

The details of the resins shown in the table are shown below.

Polyester (F): a polyester copolymer resin of terephthalic acid, 1,4-butanediol, and polytetramethylene glycol (PTMG), trade name "NOVADURAN 5505S" manufactured by Mitsubishi Engineering-Plastics Corporation.

Crosslinking thermoplastic resin (A): an acrylic styrene polymer containing epoxy groups, trade name "MARPROOF G-0250SF" manufactured by NOF CORPORATION. Mw: 20,000, Tg: 74° C., epoxy equivalent: 310 g/eq.

Crosslinking thermoplastic resin (B): an oxazoline group-modified polystyrene, trade name "EPOCROS RPS-1005" manufactured by NIPPON SHOKUBAI CO., LTD.

The results from Examples A1 to A8 and Comparative Example A1 are collectively shown in Table 2.

[Table 2]

The results summarized in Table 2 demonstrated the followings.

Comparison of Examples A1 to A3 with Comparative Example A1 confirmed that polyethylene furanoate having a structural unit derived from 2,5-furandicarboxylic acid and a structural unit derived from 1,2-ethanediol and having high intrinsic viscosity is excellent in strain hardening properties and can be made thin uniformly by blow molding or stretching, and thus is suitable for blow-molded bottle applications or biaxially stretched film applications.

In addition, comparison of Examples A4 to A8 with Comparative Example A1 confirmed that polyethylene furanoate having a structural unit derived from 2,5-furandicarboxylic acid and a structural unit derived from 1,2-ethanediol can have significantly improved strain hardening properties when combined with small amount of other thermoplastic resins, and can be made thin uniformly by blow molding or stretching, and thus is suitable for blow-molded bottle applications or biaxially stretched film applications.

The fact that the polyester of the present embodiment and the polyester composition of the present embodiment can be easily molded thinly and uniformly is presumably due to the fact that the higher the intrinsic viscosity of the polyester, the higher the strain hardening properties, as shown in FIG. 1.

The results from measurement of the stroke-stress of these polyesters are shown in FIG. 1. The measurement of FIG. 1 was performed under the same conditions as the measurement of the stress difference by the tensile test described above. FIG. 1 shows that polyester having high intrinsic viscosity is suitable for stretching because of stress rising with being stretched. The compositions combined with other thermoplastic resins are also suitable for stretching because of stress rising in the same manner.

Comparative Example A2

<Melt Polymerization>

To a reaction vessel equipped with a stirrer, a nitrogen inlet, a heater, a thermometer, a rectifying tower, 42.85 kg of 2,5-furandicarboxylic acid, 30.6 L of 1,2-ethanediol, and 14.3 g of 35% by weight aqueous solution of tetraethylam-

TABLE 2

| | PEF | | Other Resin | | Heat-pressed sheet | | |
|---|---|---|---|---|---|---|---|
| | Resin intrinsic viscosity(dl/g) | Content (Weight %) | Resin | Content (Weight %) | Stress at 100% elongation ($N/mm^2$) | Maximum Stress ($N/mm^2$) | Stress Difference ($N/mm^2$) |
| Example A1 | Polyester B 1.02 | 100 | — | — | 3.6 | 12.8 | 9.2 |
| Example A2 | Polyester C 1.12 | 100 | — | — | 6.5 | 16.6 | 10.1 |
| Example A3 | Polyester D 1.23 | 100 | — | — | 4.6 | 15.4 | 10.8 |
| Comparative Example A1 | Polyester A 0.74 | 100 | — | — | 2.8 | 5.3 | 2.5 |
| Example A4 | Polyester A 0.74 | 75 | Polyester E (TPA + 1,4BG) | 25 | 3.7 | 9.0 | 5.3 |
| Example A5 | Polyester A 0.74 | 90 | Polyester F (TPA + 1,4BG + PTMG) | 10 | 4.6 | 11.3 | 6.7 |
| Example A6 | Polyester A 0.74 | 75 | Polyester F (TPA + 1,4BG + PTMG) | 25 | 5.7 | 15.2 | 9.5 |
| Example A7 | Polyester A 0.74 | 95 | Crosslinking thermoplastic Resin A | 5 | 2.6 | 9.9 | 7.3 |
| Example A8 | Polyester A 0.74 | 90 | Crosslinking thermoplastic ResinB | 10 | 3.3 | 8.4 | 5.1 |

monium hydroxide were added as raw materials, and the inside of the reaction vessel was changed to nitrogen atmosphere. Next, the temperature was raised to 210° C. for 2 hours while stirring and held at 210° C. for 30 minutes to collect the distillate. The esterification reaction thereof was then advanced (the total heating time was 2 hours and 30 minutes).

Thereafter, the reaction solution was transferred to a reactor equipped with a pressure reducing port and a stirrer, to which 888.5 g of a 2.0% by weight solution of tetrabutyl titanate dissolved in 1,2-ethanediol (the molar ratio of Ti to 2,5-furandicarboxylic acid was 0.00019 mol) while stirring (the concentration of Ti to the produced polyester was 50 ppm). The temperature was raised to 260° C. for 1.5 hours while the pressure was gradually reduced from the normal pressure to about 130 Pa for 1.5 hours and then held at 130 Pa. After 2 hours and 47 minutes from the start of the reduced pressure, stirring was stopped, and the pressure was returned to stop the polycondensation reaction. The produced polyester was extracted from the bottom of the reactor in the form of strands, cooled through a cooling water tank, and then cut by a pelletizer to obtain polyester (a) in the form of pellets with about 2 to 3 mm square. The intrinsic viscosity of the polyester (a) was 0.61 dL/g. With respect to the end group content, the carboxyl end group content was 21 eq/t, the hydroxyl end group content was 58 eq/t, and the decarboxylated end group content was 34 eq/t, and the ratio of the decarboxylated end group content to the total of the decarboxylated end group content and the carboxyl end group content was 0.61.

Comparative Example A3

Pre-crystallization and solid phase polymerization were performed in the same manner as in Example A1 except that polyester (a) was used instead of polyester (A) to obtain polyester (b). The intrinsic viscosity of polyester (b) was 0.73 dL/g, and the decarboxylated end group content was 42 eq/t.

Comparative Example A4

Polyester (c) having an intrinsic viscosity of 0.74 dl/g was obtained in the same manner as in Comparative Example A3 except that the heating time at 200° C. at the end of solid phase polymerization was changed from 18 hours to 24 hours.

Comparative Example A5

Polyester (d) having an intrinsic viscosity of 0.76 dl/g was obtained in the same manner as in Comparative Example A3 except that the heating time at 200° C. at the end of solid phase polymerization was changed from 18 hours to 36 hours.

The reaction conditions, and the results regarding the intrinsic viscosity and the end group content in Examples A1 to A3, Comparative Examples A3 to A5, and Comparative Example B3 as described below are collectively shown in Tables 3-1 to 3-3.

[Table 3-1]

TABLE 3-1

| | | | | |
|---|---|---|---|---|
| Esterification reaction | Maximum temperature | | 200° C. | 210° C. |
| | Heating time | | 4.5 h | 2.5 h |
| Polycondensation reaction | Time from star of reduced pressure | | 3 h 50 min. | 2 h 47 min. |
| After polycondensation reaction | Decarboxylate end group [eq/t] | | 5 | 34 |
| | Carboxyl end group/ (Hydroxyl end group + Carboxyl end group) | | 0.36 | — |
| | Intrinsic viscosity [dL/g] | | 0.74 | 0.61 |
| After solid phase polymerization | Heating at 200° C. | Intrinsic | 0.85 | — |
| | for 6 hours | viscosity [dL/g] | 0.92 | — |
| | Heating at 200° C. | | 1.02 | 0.73 |
| | for 9 hours | Decarboxylate | — | 42 |
| | Heating at 200° C. | end group [eq/t] | | |
| | for 18 hours | | | |
| | Heating at 200° C. | Intrinsic | 1.12 | 0.74 |
| | for 24 hours | viscosity [dL/g] | | |
| | | Decarboxylate | 8 | — |
| | | end group [eq/t] | | |
| | Heating at 200° C. | Intrinsic | — | 0.76 |
| | for 36 hours | viscosity [dL/g] | | |
| | Heating at 200° C. | | 1.23 | — |
| | for 40 hours | | | |

[Table 3-2]

TABLE 3-2

| | | Esterification Reaction | | Intrinsic Viscosity After Melt | End group content after melt polymerization | | | | Intrinsic Viscosity After Solid phase |
|---|---|---|---|---|---|---|---|---|---|
| | Catalyst | Maximum temperature | Heating time | Polymerization (dl/g) | A (eq/t) | B (eq/t) | C (eq/t) | C/ (B + C) | Polymerization (dl/g) |
| Example A1 | Ti Concentration | 200° C. | 4.5 h | 0.74 | 51 | 29 | 5 | 0.15 | 1.02 |

TABLE 3-2-continued

| | Catalyst | Esterification Reaction Maximum temperature | Heating time | Intrinsic Viscosity After Melt Polymerization (dl/g) | End group content after melt polymerization A (eq/t) | B (eq/t) | C (eq/t) | C/ (B + C) | Intrinsic Viscosity After Solid phase Polymerization (dl/g) |
|---|---|---|---|---|---|---|---|---|---|
| Comparative Example A3 | 50 ppm | 210° C. | 2.5 h | 0.61 | 58 | 21 | 34 | 0.62 | 0.73 |

A: Hydroxyl end group content
B: Carboxyl end group content
C: Decarboxylate end group content

[Table 3-3]

TABLE 3-3

| | Heating time at 200° C. in solid phase polymerization | Intrinsic viscosity after solid phase polymerization(dl/g) |
|---|---|---|
| Example A1 | 18 h | 1.02 |
| Example A2 | 24 h | 1.12 |
| Example A3 | 40 h | 1.23 |
| Comparative Example A3 | 18 h | 0.73 |
| Comparative Example A4 | 24 h | 0.74 |
| Comparative Example A5 | 36 h | 0.76 |

The results summarized in Tables 3-1 to 3-3 supported the feasibility of obtaining highly-viscous polyester by performing an esterification reaction at a low temperature over a longer period of time to allow esterification to be sufficiently advanced, performing a polycondensation reaction using a titanium catalyst to obtain polyester with a reduced decarboxylated end group content, and subjecting the polyester to solid phase polymerization.

Example B1

A preform for bottles was manufactured using polyester (C) as a raw material. The obtained preform was subjected to blow molding using a blow molding machine (FRB-1, manufactured by Frontier inc.) to obtain a blow-molded bottle having a capacity of 350 ml, a weight of 29 g, weight/capacity of 82 g/L, an average waist wall thickness of 0.26 mm, and a base shape of Petaloid type. The yield of blow molding was 100%. The obtained bottle showed an intrinsic viscosity of 0.92 dl/g, and a degree of crystallinity of 16%. Because of the base shape being Petaloid type, the obtained bottle was a heat and pressure-resistant bottle suitable for carbonated liquid or hot beverage and having high oxygen barrier properties and excellent creep resistance and impact resistance.

Example B2

A blow-molded bottle (heat and pressure-resistant bottle) was obtained in the same manner as in Example B1, except that polyester (D) was used as a raw material instead of polyester (C). The yield of blow molding was 100%. The obtained bottle showed an intrinsic viscosity of 0.99 dl/g and a degree of crystallinity of 19%. In addition, the obtained bottle showed high oxygen barrier properties and excellent impact resistance. Further, the creep resistance was superior to that of general-purpose PET bottles.

Examples B3 to B7

A blow-molded bottle (heat and pressure-resistant bottle) was obtained in the same manner as in Example B1, except that the polyester raw materials were used in the proportion shown in Table 4. The yield of blow molding was 100%.

The obtained bottle showed oxygen barrier properties comparable to those of general-purpose PET, and excellent impact resistance. Further, the creep resistance was superior to that of general-purpose PET bottles.

Polyester (G): polyethylene terephthalate, trade name "NOVAPEX BK2180," manufactured by Mitsubishi Chemical Corporation, having an intrinsic viscosity of 0.83 dl/g.

Example B8

A blow-molded bottle (heat and pressure-resistant bottle) was obtained in the same manner as in Example B1, except that polyester (B) was used as a raw material instead of polyester (C). The yield of blow molding was 100%. In addition, the obtained bottle showed superior impact resistance to Comparative Examples B1 and B2 as described below. Further, the creep resistance was superior to that of general-purpose PET bottles.

Comparative Example B1

A blow-molded bottle was obtained in the same manner as in Example B1, except that polyester (A) was used as a raw material instead of polyester (C). The yield of blow molding was less than 95%. In addition, the obtained bottle showed poor impact resistance and creep resistance.

Comparative Example B2

Polyester (H) having an intrinsic viscosity of 0.85 dl/g was obtained in the same manner as in Example A1 except that the heating time at 200° C. at the end of solid phase polymerization was changed from 18 hours to 6 hours. A blow-molded bottle was obtained in the same manner as in Example B1, except that polyester (H) was used as a raw material instead of polyester (C). The yield of blow molding was 100%. However, the obtained bottle showed poor impact resistance and creep resistance.

Comparative Example B3

Polyester (K) having an intrinsic viscosity of 0.92 dl/g was obtained in the same manner as in Example A1 except that the heating time at 200° C. at the end of solid phase polymerization was changed from 18 hours to 9 hours.

A blow-molded bottle was obtained in the same manner as in Example B1, except that polyester (K) was used as a raw material instead of polyester (C). The yield of blow molding was 100%. However, the obtained bottle showed poor impact resistance.

Comparative Example B4

A blow-molded bottle (heat and pressure-resistant bottle) was obtained in the same manner as in Example B1, except that the polyester raw materials were used in the proportion shown in Table 4. The yield of blow molding was 100%. However, the obtained bottle showed poor impact resistance and creep resistance.

Example B9

A blow-molded bottle (heat and pressure-resistant bottle) was obtained in the same manner as in Example B1, except that the proportion of the polyester raw materials was as in Example A6. The yield of blow molding was 100%.

[Reference Example 3] Manufacture of 100% General-Purpose PET Bottle

A blow-molded bottle was obtained in the same manner as in Example B1, except that polyester (G) was used as a raw material instead of polyester (C). The performance of the obtained bottle was as shown in Table 4.

The results from Examples B1 to B8, Comparative Examples B1 to B4, and Reference Example 3 as described above are collectively shown in Table 4.

[Table 4]

TABLE 4

| | PEF | | | Performance | | | | | | |
|---|---|---|---|---|---|---|---|---|---|---|
| | Resin (Intrinsic viscosity (dl/g)) | Content (weight %) | Polyester (G) PET Content (weight %) | Oxygen barrier Properties (fold) | Blow mold ability | Creep resistance Overall height | Creep resistance Body diameter Rate of change | Creep resistance Volume | Impact resistance With carbonater water 80 cm drop | Impact resistance Without carbonated water 80 cm drop |
| Comparative Example B1 | Polyester A (0.74) | 100 | no | 6.4 | X | ◎ | X | X | X | X |
| Comparative Example B2 | Polyester H (0.85) | 100 | no | 8.2 | ○ | ◎ | X | X | X | X |
| Comparative Example B3 | Polyester K (0.92) | 100 | no | — | ○ | ◎ | X | X | X | X |
| Example B8 | Polyester B (1.02) | 100 | no | 9.1 | ○ | — | — | — | Δ | — |
| Example B1 | Polyester C (1.12) | 100 | no | 9.1 | ○ | ◎ | ○ | ○ | ○ | ○ |
| Example B2 | Polyester D (1.23) | 100 | no | 9.1 | ○ | ◎ | ◎ | ◎ | ○ | ○ |
| Comparative Example B4 | Polyester A (0.74) | 20 | 80 | 1.4 | X | ◎ | X | X | X | X |
| Example B3 | Polyester C (1.12) | 10 | 90 | 1.4 | ○ | ◎ | ◎ | ◎ | ○ | ○ |
| Example B4 | | 15 | 85 | 1.6 | ○ | ◎ | ◎ | ◎ | ○ | ○ |
| Example B5 | | 20 | 80 | 1.9 | ○ | ◎ | ○ | ○ | ○ | ○ |
| Example B6 | Polyester D (1.23) | 10 | 90 | 1.3 | ○ | ◎ | ○ | ◎ | ○ | ○ |
| Example B7 | | 15 | 85 | 1.6 | ○ | ◎ | ○ | ◎ | ○ | ○ |
| Reference Example 3 | — | no | 100 | 1 | ○ | ○ | ○ | ○ | ○ | ○ |

The results summarized in Table 4 demonstrated the followings.

Comparison of Examples B1, B2, and B8 with Comparative Examples B1 to B3 confirmed that, though it is generally thought that the intrinsic viscosity in PET bottles is preferably 0.7 dL/g, the polyester of the present embodiment is suitable for blow-molded bottle applications because of its much higher intrinsic viscosity than this value. In particular, it is showed that blow-molded bottles manufactured using the polyester of the present embodiment have low weight/internal capacity ratio and thus are thin and light, but nevertheless have high oxygen barrier properties and thus are suitable for applications in which the bottles are filled with liquid that is susceptible to air oxidation, such as wine. In addition, the blow-molded bottles have high creep resistance and impact resistance even in a state with high concentration of carbonated water charged, and thus are also suitable for applications in which the bottles are filled with carbonated liquid such as carbonated beverage. Further, the polyester of the present embodiment has high glass transition temperature and excellent heat resistance due to inclusion of a structural unit derived from 2,5-furandicarboxylic acid, and thus may also be suitable as bottles for hot beverage. The polyester of the present embodiment showed good blow moldability, and the use thereof resulted in blow-molded bottles having excellent oxygen barrier properties, impact resistance, and creep resistance, which may be because of the fact that the higher the intrinsic viscosity of the polyester, the higher the strain hardening properties as shown in FIG. 1, enabling more uniform and thinner bottle to be molded.

In addition, comparison of Examples B3 to B7 with Comparative Example B4 confirmed that the combination of polyethylene terephthalate and polyester having a structural unit derived from 2,5-furandicarboxylic acid and a structural unit derived from aliphatic diol and having high intrinsic viscosity can improve the blow moldability, and improve the oxygen barrier properties and creep resistance of polyethylene terephthalate. Thus, it was demonstrated that blow-molded bottles manufactured using the polyester of the present embodiment are heat and pressure-resistant bottles having excellent gas barrier properties, creep resistance, heat resistance, and impact resistance, which are suitable for applications such as bottles to be filled with hot beverage, carbonated liquid, or alcohol-containing liquid.

Reference Example 4

To a reaction vessel equipped with a stirrer, a nitrogen inlet, a heater, a thermometer, a pressure reducing port, 85.7 g of 2,5-furandicarboxylic acid (V & V Pharma Industries), 68.16 g of 1,2-ethanediol (Mitsubishi Chemical Corporation), 0.036 g of antimony trioxide ($Sb_2O_2$) (the concentration of Sb relative to the produced polyester was 300 ppm), and 0.029 g of 35% by weight aqueous solution of tetraethylammonium hydroxide were added as raw materials, and the inside of the reaction vessel was changed to nitrogen atmosphere.

Next, the reaction vessel was immersed in an oil bath set at 120° C. and the temperature was raised to 210° C. for 60 minutes while stirring and held at 210° C. for 200 minutes to collect the distillate. The esterification reaction thereof was then advanced. A portion of the reaction solution was taken and analyzed by a method using a nuclear magnetic resonance spectrometer, and the esterification reaction rate was 94%.

Thereafter, the temperature was raised to 260° C. for 1.5 hours while the pressure was gradually reduced from the normal pressure to about 130 Pa for 1.5 hours and then held at 130 Pa. After 6 hours from the start of the reduced pressure, stirring was stopped, and the pressure was returned to stop the polycondensation reaction. The produced polyester was extracted from the bottom of the reactor in the form of strands, cooled through a cooling water tank, and then cut by a pelletizer to obtain polyester (K) in the form of pellets with about 2 to 3 mm square. The intrinsic viscosity of the polyester (K) was 0.65 dL/g. With respect to the end group content, the carboxyl end group content was 12 eq/t, the hydroxyl end group content was 97 eq/t, and the decarboxylated end group content was 12 eq/t, and the ratio of the decarboxylated end group content to the total of the decarboxylated end group content and the carboxyl end group content was 0.5.

Using the polyesters (I) to (K) obtained in Reference Examples 1, 2, and 4, attempts to improve their molecular weights by solid phase polymerization was made. Ten grams of the pellets were placed in an inert oven and heated at 120° C. for 6 hours in the presence of nitrogen gas at a flow rate of 30 L/min. Then, these pellets were cooled to the normal temperature (25° C.) before the fused pellets were separated from each other. Further, these pellets were heated at 150° C. for 3 hours, 180° C. for 3 hours, and 200° C. for 9 hours for solid phase polymerization. The intrinsic viscosity of the polyester after solid phase polymerization is shown in Table 5.

[Table 5]

TABLE 5

| | Catalyst | Intrinsic viscosity after melt polymerization (dl/g) | End group content after melt polymerization A (eq/t) | B (eq/t) | C(eq/t) | C/(B + C) | Intrinsic viscosity after solid phase polymerization (dl/g) |
|---|---|---|---|---|---|---|---|
| Reference Example 1 | Ti Concentration 50 ppm | 0.78 | 71 | 23 | 4 | 0.15 | 1.01 |
| Reference Example 2 | Ti Concentration 50 ppm | 0.81 | 38 | 19 | 29 | 0.6 | 0.93 |
| Reference Example 4 | Sb Concentration 300 ppm | 0.65 | 97 | 12 | 12 | 0.5 | 0.82 |

As shown in Table 5, when the decarboxylated end content (C) was high, or when the ratio of the decarboxylated end group content to the total of the decarboxylated end group content and the carboxyl end group content (C/(B+C)) was more than 0.5, the solid phase polymerization rate was slowed. It was also shown that polymerization proceeded more rapidly with titanium catalysts than antimony catalysts.

What is claimed is:

1. Polyethylene furanoate having an intrinsic viscosity of from 1.1 dl/g to 1.50 dl/g, as measured by a method comprising:

a. dissolving 0.25 g of polyethylene furanoate in 50 ml of a mixed solvent of phenol/1,1,2,2-tetrachloroethane=50/50 (weight ratio); and b. measuring the intrinsic viscosity using an Ubbelohde viscometer at 30° C., wherein the Huggins constant is 0.32;

wherein the polyethylene furanoate contains an aliphatic diol structural unit in an amount of 50 mol % or more based on 100 mol % of the entire diol structural units contained in the polyethylene furanoate.

2. Polyethylene furanoate according to claim 1, containing titanium atoms in an amount of from 1 to 100 ppm.

3. Polyethylene furanoate according to claim 1 for use in blow-molded bottles.

4. Polyethylene furanoate according to claim 1, wherein the aliphatic diol structural unit is contained in an amount of 70 mol % or more based on 100 mol % of the entire diol structural units contained in the polyethylene furanoate.

5. A method of manufacturing the polyethylene furanoate of claim 1, the method comprising:

a step of manufacturing a polyethylene furanoate raw material, in which the polyethylene furanoate raw material is manufactured using a titanium catalyst; and a solid phase polymerization step, in which the polyethylene furanoate raw material is subjected to solid phase polymerization;

wherein the polyethylene furanoate raw material has an intrinsic viscosity of from 0.65 dl/g to 0.85 dl/g, as measured by the following method, and has a decarboxylated end group content, represented by the following formula, of 20 eq/t or less;

[Chem 1]

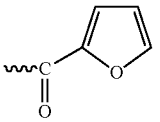

the method comprising:

dissolving 0.25 g of the polyethylene furanoate raw material in 50 ml of a mixed solvent of phenol/1,1,2,2-tetrachloroethane=50/50 (weight ratio); and measuring the intrinsic viscosity using an Ubbelohde viscometer at 30° C., wherein the Huggins constant is 0.32.

6. The method of manufacturing highly-viscous polyethylene furanoate according to claim 5, wherein the ratio of the decarboxylated end group content to the total of the decarboxylated end group content and the carboxyl end group content in the polyethylene furanoate raw material is 0.5 or less.

7. A polyester composition comprising the polyethylene furanoate according to claim 1, and a thermoplastic resin other than the polyethylene furanoate.

8. The polyester composition according to claim 7, wherein the amount of the polyethylene furanoate is from 1 to 20% by weight, and wherein the thermoplastic resin is polyethylene terephthalate.

9. A polyester composition comprising 50% by weight or more of the polyethylene furanoate of claim 1, wherein the polyester composition further comprises a crosslinking thermoplastic resin and/or other thermoplastic polyester resin other than the polyethylene furanoate, wherein the other thermoplastic polyester resin has a terephthalic acid structural unit, and has a structural unit selected from a 1,4-butanediol structural unit and a polytetramethylene glycol structural unit.

10. A method of manufacturing a polyester bottle comprising polyethylene furanoate, the method comprising:

an injection molding step of manufacturing a preform from a polyester raw material; and a blow molding step of manufacturing a bottle from the preform, wherein the polyester raw material comprises the polyethylene furanoate according to claim 1.

11. A method of manufacturing a polyester bottle comprising polyethylene furanoate, the method comprising:

an injection molding step of manufacturing a preform from a polyester raw material; and a blow molding step of manufacturing a bottle from the preform, wherein the polyester raw material is a polyester composition according to claim 9.

12. A blow-molded bottle that is a molded product made of the polyethylene furanoate according to claim 1.

13. The blow-molded bottle according to claim 12, for filling with carbonated liquid.

14. The blow-molded bottle according to claim 12, for filling with hot beverage.

15. A blow-molded bottle that is a molded product made of the polyester composition according to claim 7.

16. The blow-molded bottle according to claim 15, for filling with carbonated liquid.

17. The blow-molded bottle according to claim 15, for filling with hot beverage.

18. A beverage product, in which the blow-molded bottle according to claim 12 is filled with a beverage.

* * * * *